(12) United States Patent
Han et al.

(10) Patent No.: US 12,450,350 B2
(45) Date of Patent: Oct. 21, 2025

(54) METHOD AND DEVICE FOR IMAGE-BASED MALWARE DETECTION, AND ARTIFICIAL INTELLIGENCE-BASED ENDPOINT DETECTION AND RESPONSE SYSTEM USING SAME

(71) Applicant: NPCORE, INC., Seoul (KR)

(72) Inventors: Seung Chul Han, Seoul (KR); Hyo Seop Bang, Seoul (KR); Dong Hwan Sun, Seoul (KR); Kyung Shin Kim, Seoul (KR)

(73) Assignee: NPCORE, INC., Seoul (KR)

( * ) Notice: Subject to any disclaimer, the term of this patent is extended or adjusted under 35 U.S.C. 154(b) by 147 days.

(21) Appl. No.: 18/038,709

(22) PCT Filed: Nov. 19, 2021

(86) PCT No.: PCT/KR2021/017116
§ 371 (c)(1),
(2) Date: May 25, 2023

(87) PCT Pub. No.: WO2022/114689
PCT Pub. Date: Jun. 2, 2022

(65) Prior Publication Data
US 2023/0418943 A1 Dec. 28, 2023

(30) Foreign Application Priority Data
Nov. 26, 2020 (KR) .......................... 10-2020-0161665
Nov. 19, 2021 (KR) .......................... 10-2021-0160542

(51) Int. Cl.
*G06F 21/56* (2013.01)

(52) U.S. Cl.
CPC ................................ *G06F 21/566* (2013.01)

(58) Field of Classification Search
CPC ........ G06F 21/566; G06F 21/55; G06F 21/56; G06F 21/563; G06N 20/00; G06T 7/00
See application file for complete search history.

(56) References Cited

U.S. PATENT DOCUMENTS 10,162,967 B1    12/2018  Oliver et al.
10,592,521 B2 *   3/2020  Russell ............... G06F 3/04842
                          (Continued)

FOREIGN PATENT DOCUMENTS

CN    107392019 A  * 11/2017  ........... G06F 21/561
CN    112380535 A  *  2/2021  ........... G06F 21/563
                    (Continued)

OTHER PUBLICATIONS

K. Kancherla and S. Mukkamala, "Image visualization based malware detection," 2013 IEEE Symposium on Computational Intelligence in Cyber Security (CICS), Singapore, 2013, pp. 40-44 (Year: 2013).*

(Continued)

*Primary Examiner* — Michael R Vaughan
(74) *Attorney, Agent, or Firm* — LEX IP MEISTER, PLLC

(57) ABSTRACT

Disclosed is a method and device for image-based malware detection, and artificial intelligence-based endpoint detection and response system using same. The method includes the steps of: reading, as bytes of an unsigned integer of constant bits, an executable file or at least a portion of the code of an executable file located in a file path of a generated file obtained from a file generation event log detected in an EDR system or a processor, a memory, or a storage device associated with an endpoint, and converting same into a byte array; reading two bytes at a time from the byte array; using the two bytes of data as coordinates of an image of a preset size to increase a corresponding coordinate value, and adding an RGB channel to store an image array; and (Continued)

performing deep learning analysis using an image deep learning model on the image array.

18 Claims, 26 Drawing Sheets

(56) References Cited

U.S. PATENT DOCUMENTS

| | | | |
|---|---|---|---|
| 10,762,200 B1* | 9/2020 | Salem | G06F 21/566 |
| 11,436,328 B1* | 9/2022 | Strogov | G06F 16/128 |
| 11,790,085 B2* | 10/2023 | Kim | G06N 3/08 |
| | | | 726/24 |
| 2012/0311713 A1* | 12/2012 | Amit | H04L 63/1466 |
| | | | 726/25 |
| 2018/0183815 A1 | 6/2018 | Enfinger | |
| 2019/0042745 A1* | 2/2019 | Chen | G06V 20/62 |
| 2019/0121980 A1* | 4/2019 | Jung | G06F 21/566 |
| 2021/0312077 A1* | 10/2021 | Jain | G06F 21/46 |
| 2021/0334374 A1* | 10/2021 | Vasudeva | G06F 21/602 |
| 2023/0362175 A1* | 11/2023 | Li | H04L 41/16 |
| 2025/0016185 A1* | 1/2025 | Han | G06F 40/279 |

FOREIGN PATENT DOCUMENTS

| | | |
|---|---|---|
| KR | 10-2019-0040755 A | 4/2019 |
| KR | 10-2020-0048221 A | 5/2020 |
| KR | 10-2144914 B1 | 8/2020 |
| WO | WO-2009143742 A1 * 12/2009 | ............. G06F 21/51 |

OTHER PUBLICATIONS

Jinrong Chen. 2020. A Malware Detection Method Based on Rgb Image. In Proceedings of the 2020 6th International Conference on Computing and Artificial Intelligence (ICCAI '20). Association for Computing Machinery, New York, NY, USA, 283-290. (Year: 2020).*

Italakshmi Venkatraman, Mamoun Alazab, R. Vinayakumar. A hybrid deep learning image-based analysis for effective malware detection. Journal of Information Security and Applications, vol. 47, 2019, pp. 377-398. (Year: 2019).*

KyoungSoo Han, Jae Hyun Lim, and Eul Gyu Im. 2013. Malware analysis method using visualization of binary files. In Proceedings of the 2013 Research in Adaptive and Convergent Systems (RACS '13). Association for Computing Machinery, New York, NY, USA, 317-321. (Year: 2013).*

* cited by examiner

FIG. 18

| ANALYSIS STATE | | | | | |
|---|---|---|---|---|---|
| DATE 🔍 | FILE NAME 🔍 | PATH 🔍 | HASH VALUE 🔍 | FILE... 🔍 | 🔍 |
| <INPUT> | <INPUT> | <INPUT> | <INPUT> | <...> | <INPUT> |
| 2020/10/20 11:56... | Sample.exe | c:\Users\ad... | e91294d9cb741f... | 2.73MB | ⊖ BlackList |
| 2020/10/20 11:56... | Sample.exe | c:\Users\ad... | e91294d9cb741f... | 2.73MB | ⊖ BlackList |
| 2020/10/20 11:56... | Sample.exe | c:\Users\ad... | e91294d9cb741f... | 2.73MB | ⊖ BlackList |
| 2020/10/20 11:56... | Sample.exe | c:\Users\ad... | e91294d9cb741f... | 2.73MB | ⊖ BlackList |
| 2020/10/20 11:56... | Sample.exe | c:\Users\ad... | e91294d9cb741f... | 0 BYTES | ⊖ BlackList |
| 2020/10/20 11:56... | Microsoft.Photo.exe | c:\Program... | 28ecbc7a01aea... | 20.0KB | ⊘ RESUMED |
| 2020/10/20 11:56... | TrustedInstaller.exe | c:\Windows... | 09440fa30c020b... | 120KB | ⊘ RESUMED |
| 2020/10/20 11:56... | SIHClient.exe | c:\Windows... | a80a7da172e679... | 216KB | ⊘ RESUMED |
| 2020/10/20 11:56... | InstallAgent.exe | c:\Windows... | 43be32bb884623... | 207KB | ⊘ RESUMED |
| 2020/10/20 11:56... | sc.exe | c:\Windows... | bd31eb150f6547... | 68.0KB | ⊘ RESUMED |
| 2020/10/20 11:56... | wsqmcons.exe | c:\Windows... | 41ea1b4109fd33... | 76.5KB | ⊘ RESUMED |

1830 — APPLY    REFRESH    CLOSE

1820 — ⊖ BlackList ▷
       ⊖ BlackList
       ⊘ Allow

⊘ Allow ▷

```
def get_image(self,path):
    try:
        file = path.split("\\")[-1]
        a, width = self.conversion_img(path)
        g = np.resgape(a, (int(len(a)/width),width))
        g = np.uint8(g)
        fpng = Test_dir+'/' + file + ".png"
        imageio.imwrite(fpng, g)
```
(a)

```
def conversion_vector(self,path):
    with open(path, 'rb') as f:
        ln = os.path.getsize(path)
        width = int(ln ** 0.5)
        rem = ln % width
        a = array.array("B")
        a.fromfile(f, ln - rem)
        return a, width
```
(b)

FIG. 23

```
def Glcm_convert_file(path" str, save_path: str) -> None:
    try:
        filename = os.path.basename(path)
        with open(path, 'rb') as f:
            img_array = np.array(bytearray(f.read()))

If not list(img_array):
            with open('./log.txt','a') as f:
                f.write(cur_time()+' ')
                f.write(filename + '\n')
            os.remove(dir+filename)
            print('{0} {1}',format(cur_time(), path))
        img_byte = np.array([img_array]).astype(dtype='uint8')
        matrix = greycomatrix(image=img_byte, distances=[1], andles=[0])
        matrix = np.squeeze(matrix)
        filepng = save_path + '/' + filename + ".png"

img = image.fromarray(matrix.astype('<14'))
        img.comvert("L").save(filepng)
```

METHOD AND DEVICE FOR IMAGE-BASED MALWARE DETECTION, AND ARTIFICIAL INTELLIGENCE-BASED ENDPOINT DETECTION AND RESPONSE SYSTEM USING SAME

CROSS-REFERENCE TO RELATED APPLICATION

The present application is a U.S. National Phase application filed under 35 U.S.C. § 371 of International Application No. PCT/KR2021/017116 filed on Nov. 19, 2021, which claims under 35 U.S.C. § 119(e) the benefit of Korean Patent Application No. 10-2020-0161665 filed on Nov. 26, 2020 and Korean Patent Application No. 10-2021-0160542 filed on Nov. 19, 2021, the entire contents of which are incorporated by reference herein.

BACKGROUND

(a) Technical Field

The present disclosure relates to an artificial intelligence-based next-generation endpoint detection and response (EDR) system for proactively responding to unknown security threats, and more particularly, to a malware analysis method and apparatus for monitoring major operations in a process performed in a computing device, such as a personal computer or an EDR system, on the basis of an indicator of compromise (IoC) and performing image-based analysis on a monitoring result with respect to advanced persistent threats (APTs), which are persistent target attacks, to respond to infringement threats.

(b) Description of the Related Art

As information technology (IT) infrastructure is continuously expanded, advanced persistent threats (APTs), which are various types of security threats using IT infrastructure, are rapidly increasing.

In particular, there is an urgent need to take measures to prevent the occurrence of important information leakage accidents using malicious code in companies, reduction of concentration on work due to access to non-business sites by insiders, and information leakage accidents due to reduction of concentration on work.

Therefore, in order to respond to continuous security threats causing damage, a mass amount of malicious code and threat-related data should be analyzed, and the demand for the development of a malware learning and classification module for analyzing images through automatic learning for effective analysis is increasing.

Meanwhile, overseas and domestic APT solution manufacturers related to existing malware detection and response technologies have suggested various response solutions to respond to new or variant malicious codes but security threats that are gradually growing in size and becoming intelligent are difficult to respond to in real time.

Accordingly, endpoint detection and response (EDR) solution development companies studying malware detection technology using machine learning have actively used artificial intelligence (AI) technology to detect some cyber threats that could not be detected using existing signature-based or rule-based solutions.

In addition, an endpoint infringement accident response solution has been actively introduced to collect information from endpoint devices, and automatically detect and respond to signs of cyber-attacks in real time through correlation analysis and machine learning by collecting information from endpoint devices.

In addition, various threat intelligence tools for distributed remote forensic analysis have been developed as proactive response techniques for malicious behaviors in personal computers (PCs). Some related art depends only on analysis of signatures and behaviors. In addition, various static application security testing (SAST) tools for testing the security of software applications developed in various languages, such as C/C++, Ruby, and Python, are being developed.

However, in order to effectively analyze and respond to the aforementioned malware or threat attacks, it is most desirable to directly analyze malicious code inside agents installed in PCs, terminals, servers, etc. but such solutions have not yet been proposed.

SUMMARY

To meet the requirements of the prior art described above, the present disclosure is directed to a malware detection method and apparatus for effectively analyzing malicious code on the basis of images in an agent installed in personal computers (PCs), terminals, servers, etc., as well as a target system such as the next-generation endpoint detection and response (EDR) system.

The present disclosure is also directed to providing an image-based malware detection method and apparatus that are capable of continuously monitoring and analyzing all events occurring at an endpoint on the basis of an indicator of compromise (IoC) and responding to an infringement threat, and can be used in a big data-based intelligent forensic analysis system.

The present disclosure is also directed to providing an image-based malware detection method and apparatus for performing high-level malware learning and classification in an agent for a multi-platform in which memory resource allocation is minimized to prevent a load on the system.

The present disclosure is also directed to providing an image-based malware detection method and apparatus for detecting new and variant malicious codes from big data collected through a malware imaging algorithm, an imaged malware learning/classification technique, and machine learning-based static and dynamic analysis or similarity analysis.

The present disclosure is also directed to providing an image-based malware detection method and apparatus for detecting new and variant malicious codes that bypass antivirus software (vaccines) by a signature-less method to perform a proactive response before the infection of an endpoint such as a local personal computer (PC), and dynamically analyzing remote behavior-based malicious code through virtual and real-environment step analysis.

The present disclosure is also directed to providing an image-based malware detection apparatus equipped with a backup engine for an automatic instant backup of internal data and restoration of an original file through detection of malicious behaviors occurring in an operating system (OS) of a user, and a method thereof.

The present disclosure is also directed to providing an image-based malware detection method and apparatus for collecting and distributing, in real time, latest threat intelligence (TI), such as an IoC, a malware pattern, a YARA rule, a malware source, a command & control (C&C) server, etc., which are collected through various analyses, and detecting malicious code on the basis of the collected TI.

The present disclosure is also directed to providing an endpoint agent-based or artificial intelligence-based EDR system using the image-based malware detection methods and apparatuses described above.

According to an aspect of the present disclosure, an image-based malware detection method performed by a malware detection apparatus connected to a computing device includes: reading either an execution file in a file path of a generated file obtained from a file generation event log detected in a processor, a memory, or a storage device associated with the computing device or at least some codes of the execution file in units of bytes consisting of unsigned integer bits, and converting the read bytes into a byte array; reading the byte array in units of two bytes: increasing coordinates (x,y) on a predetermined-sized image using the 2-byte data as the coordinates (x,y), adding RGB channels, and storing an image array; and performing deep learning analysis on the image array using an image deep learning model.

In an embodiment, the performing of the deep learning analysis may include adjusting a size of an input layer for analyzing the image array, calling a pre-trained deep learning model, and inputting the image array to the deep learning model.

In an embodiment, the performing of the deep learning analysis may include detecting malicious code or determining a possibility of occurrence of a known threat or an unknown threat on the basis of a predetermined threshold after an analysis of the deep learning model.

In an embodiment, the performing of the deep learning analysis may include detecting malicious code or determining a possibility of occurrence of a known threat or an unknown threat on the basis of image texture of different sections or binary pieces of the execution file or the code after an analysis of the deep learning model.

In an embodiment, the converting of the read bytes into the byte array may include converting the file unpacked by performing memory dump on the execution file loaded into the memory into the byte array and storing the byte array when the execution file is executed.

In an embodiment, the storing of the image array may include inserting the byte array into the predetermined-sized image in units of two bytes in a predetermined order, specifying an increase in a distance to the coordinates in a distance parameter, and specifying an array angle of an increase in the coordinates using an angle parameter.

In an embodiment, the image-based malware detection method may further include registering a specific color image of the execution file or the code in a whitelist, when the execution file or the code is analyzed by automatic analysis or machine learning and determined as normal.

In an embodiment, when an object to be analyzed automatically or by machine learning or a file registered in a gray list is executed, the image-based malware detection method may further include tracking or monitoring the file or a process of the file, and determining that an image-based malware detection process is to be performed on the file or at least some codes of the file when it is determined that a predetermined malicious behavior is performed by the file.

In an embodiment, the image-based malware detection method may further include training the image deep learning model with a file containing malicious code and a normal file. The performing of the deep learning analysis may include classifying, by the trained image deep learning model, a suspected file as normal or malicious on the basis of a similarity hashing function trained with basic feature information of the execution file, classifying the suspected file as normal or malicious on the basis of a similarity hashing function trained with all feature information extractable from the execution file, classifying the suspected file as normal or malicious through a malicious code image analysis algorithm, or classifying or detecting the suspected file as normal or malicious using a combination of these classification methods.

In an embodiment, the malicious code image analysis algorithm may perform machine learning-based similarity classification on an image array input to the trained image deep learning model. The machine learning-based similarity classification may include determining a correlation between homogeneous, variant, or similar malicious codes.

According to another aspect of the present disclosure, an image-based malware detection apparatus includes: a byte array converter configured to read either an execution file in a file path of a generated file obtained from a file generation event log detected in a processor, a memory, or a storage device associated with a specific computing device or at least some codes of the execution file in units of bytes consisting of unsigned integer bits, and convert the read bytes into a byte array; a coordinate mapper configured to read the byte array in units of two bytes: a coordinate RGB channel increaser configured to increase coordinates (x,y) on a predetermined-sized image using the 2-byte data as the coordinates (x,y), add RGB channels, and store the image array; and an image deep learning analyzer configured to perform deep learning analysis on the image array using an image deep learning model.

In an embodiment, the image deep learning analyzer may include a deep learning model caller configured to call a pre-trained deep learning model, a deep learning model analyzer configured to analyze the image array by inputting the image array to the deep learning model, and a malicious code determiner configured to determine whether the image array is malicious code.

In an embodiment, the malicious code determiner may detect malicious code or determine a possibility of occurrence of a known threat or an unknown threat with respect to an analysis result of the deep learning model analyzer on the basis of a predetermined threshold.

In an embodiment, the malicious code determiner may detect malicious code or determine a possibility of occurrence of a known threat or an unknown threat with respect to an analysis result of the deep learning model analyzer on the basis of image textures of different sections or binary pieces of the execution file or the code.

In an embodiment, the byte array converter may convert into the byte array the file unpacked by performing memory dump on the execution file loaded to the memory and store the byte array, when the execution file is executed.

In an embodiment, the coordinate RGB channel increaser may specify a range of the coordinates on the predetermined-sized image by increasing the range in units of two bytes of the byte array from a grayscale range to a maximum RGB range, increase the coordinates by 1, increase a range of a green channel when the range of the RGB channels exceeds a predetermined reference range, and increase a range of a blue channel when the range of the green channel exceeds the predetermined reference range.

In an embodiment, the image-based malware detection apparatus may further include a storage or a storage management system configured to back up a file in a driver of the computing device to a temporary storage folder in response to a signal from the malicious code determiner of the image deep learning analyzer when the image deep learning analyzer detects analysis of a behavior of ransomware.

According to another aspect of the present disclosure, an artificial intelligence-based endpoint detection and response (EDR) system includes: a data collector configured to detect a file generation event in a processor, a memory, or a storage device associated with a specific computing device and extract a file path of a generated file from a file generation event log; a byte array converter configured to read an execution file in the file path received from the data collector or at least some codes of the execution file in units of bytes consisting of unsigned integer bytes, and convert the byte into a bite array; a coordinate mapper configured to read the byte array in units of two bytes; a coordinate RGB channel increaser configured to increase coordinates (x,y) on a predetermined-sized image using the 2-byte data as the coordinates (x,y), add RGB channels, and store the image array; and an image deep learning analyzer configured to perform deep learning analysis on the image array using an image deep learning model.

In an embodiment, the data collector may include an endpoint agent installed in another computing device at a remote place.

In an embodiment, the EDR system may further include a cloud management system configured to manage a plurality of computing devices in a network to which the endpoint agent is connected.

BRIEF DESCRIPTION OF DRAWINGS

FIG. 18 is a diagram of an example of a user interface screen for describing an endpoint security operation of the endpoint agent of FIG. 15.

FIG. 20 is a diagram illustrating an example of conversion source code for describing a process of obtaining an image by the endpoint agent of FIG. 15 by defining code of an execution file as a width of preset bytes and converting the code into an image.

FIG. 23 is a diagram illustrating an example of a conversion source code for describing a gray-level co-occurrence matrix (GLCM) conversion image module to be employed in the malware detection process of FIG. 22.

DETAILED DESCRIPTION

Figure 1:
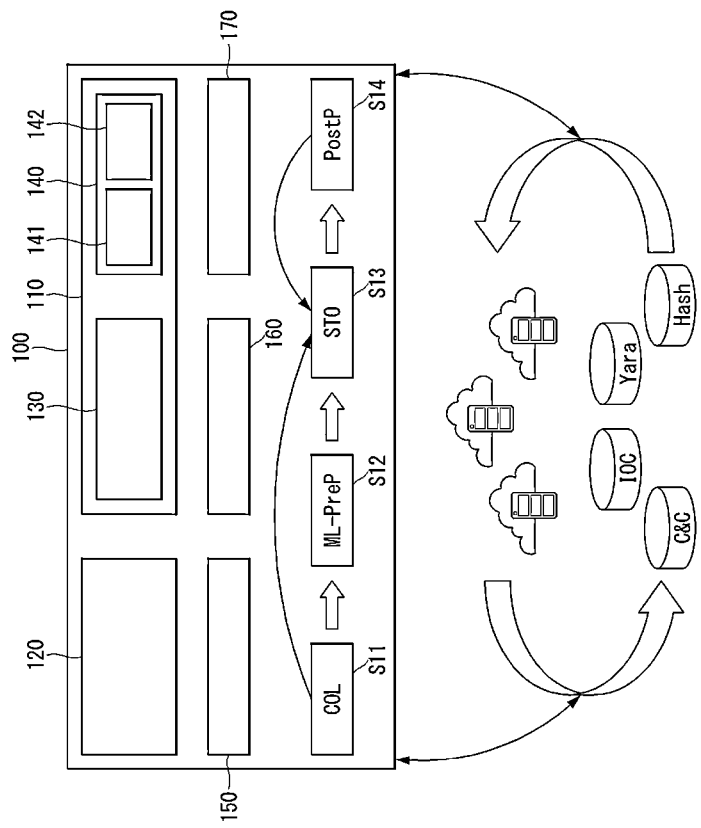
FIG. 1 is a schematic configuration diagram of an artificial intelligence (AI)-based next-generation endpoint detection and response (EDR) system for a proactive response to unknown security threats according to an embodiment of the present disclosure.

Various modifications may be made in the present disclosure and various embodiments may be implemented and thus embodiments are illustrated in the drawings and described in the detailed description below. However, it should be understood that the present disclosure is not limited to particular embodiments and includes all modifications, equivalents, and alternatives falling within the idea and scope of the present disclosure. In describing each drawing, like reference numerals are used for like elements.

Terms such as "first," "second," "A," "B," and the like may be used to describe various components but the components should not be limited by these terms. The terms are only used to distinguish one component from another. For example, a first component may be referred to as a second component without departing from the scope of the present disclosure, and similarly, a second component may also be referred to as a first component. The term "and/or" includes a combination of a plurality of related items described herein or any one of the plurality of related items.

When a component is referred to as being "coupled" or "connected" to another component, it should be understood that the component may be directly coupled or connected to the other component, or another component may be interposed therebetween. In contrast, when a component is referred to as being "directly coupled" or "directly connected" to another component, it should be understood that no component is interposed therebetween.

The terms used herein are only used to describe certain embodiments and are not intended to limit the present disclosure. As used herein, the singular expressions are intended to include plural forms as well, unless the context clearly dictates otherwise. It should be understood that the terms "comprise" and/or "comprising," when used herein, specify the presence of stated features, integers, steps, operations, elements, components, or a combination thereof, but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted with ideal or excessively formal meanings unless explicitly defined herein.

Hereinafter, example embodiments of the present disclosure will be described in more detail with reference to the accompanying drawings. In the following description of the present disclosure, in order to facilitate understanding of the present disclosure, the same elements in the drawings are assigned the same reference numerals and are not redundantly described herein.

FIG. 1 is a schematic configuration diagram of an artificial intelligence (AI)-based next-generation endpoint detection and response (EDR) system for a proactive response to unknown security threats according to an embodiment of the present disclosure.

Referring to FIG. 1, an AI-based next-generation EDR system 100 includes an analysis system 110, a cloud management system 120, a dynamic malware analysis system 150, a malware learning and classification system 160, an indicator of compromise (IoC) and threat information management system 170, and the like. The analysis system 110 includes a data collector 130 and an image converter 140, and may be referred to as an intelligent forensic analysis system or a threat analysis server. The image converter 140 may include an imaging module 141 and an image classification module 142. The dynamic malware analysis system 150 may include a behavior-based dynamic malware analysis system.

Although the dynamic malware analysis system 150, the malware learning and classification system 160, and the IoC and threat information management system 170 are described as separate components in the present embodiment, the present disclosure is not limited thereto, and the analysis system 110 may be configured to include the dynamic malware analysis system 150, the malware learning and classification system 160, and the IoC and threat information management system 170. In this case, the dynamic malware analysis system 150, the malware learning and classification system 160, and the IoC and threat information management system 170 may be referred to as a dynamic malware analysis module, a malware learning and classification module, and an IoC and threat information management module, respectively.

Major components will now be described in more detail. The analysis system 110 may have an agent function of collecting major behaviors occurring in a network, a file, a process, a registry, etc., which are associated with an endpoint, based on an IoC. The agent function may be implemented for intelligent forensic analysis through collection of infringement threats at the endpoint.

In addition, the analysis system 110 stores collected monitoring data in a form in which big data analysis can be performed, and performs intelligent forensic analysis and malicious behavior detection using collected behavior information.

The dynamic malware analysis system 150 may include a behavior-based dynamic malware analysis system capable of simultaneously operating real and virtual environments. The dynamic malware analysis system 150 may detect behaviors of malicious code in a network, a file, a process, a registry, etc. on the basis of a behavior rule, and store data, which is collected through static and dynamic analysis of detected malicious code, to be analyzed. The collected data may be big data stored to be analyzed.

In addition, the dynamic malware analysis system 150 may analyze malicious behaviors by executing a file in a physical real-machine-based sandbox environment to respond to malicious code that avoids a virtual machine. To this end, the dynamic malware analysis system 150 may be configured to dynamically analyze malicious code on the basis of behaviors in a virtual machine (VM) and a real machine.

The malware learning and classification system 160 may include a malware learning and classification module to which a malware image analysis technique is applied. The malware learning and classification system 160 may use a malware imaging algorithm and tune machine learning parameters for learning images. In addition, the malware learning and classification system 160 may learn and classify malware images using a machine learning algorithm. That is, the system 160 may detect malicious code by analyzing similarity between pieces of big data, which are collected through a static and dynamic analysis of malicious code, based on machine learning and analyzing malicious code derived from the original malicious code by a modeling technique.

The IoC and threat information management system 170 may manage latest threat intelligence (TI), such as an IoC, a malware pattern, a YARA rule, a malware source, a command & control (C&C) server, and a hash of malicious code, which is collected through various analyses, in a format such as OpenIOC or a structured threat information expression (STIX), and share the latest TI with other systems or distribute the latest TI through a standard protocol such as a trusted automated exchange of intelligence information (TAXII). In other words, the IoC and threat information management system 170 may perform an instant backup and restoration function to defend against ransomware attacks at an endpoint, or share a latest IoC and TI, which are generated by the system, with a public system such as the cyber safety center of the Korea Internet Security Agency (KISA) or distribute the latest IoC and TI through a standard protocol.

Main functions of the AI-based next-generation EDR system 100 of the present embodiment will be described below.

First, the EDR system 100 collects infringement threats with respect to major behaviors in a network, a file, a process, a registry, etc. at an endpoint through a collecting module (COL) (S11). Such a collection function of an agent may be installed to interwork with an instant backup function when a ransomware attack is detected while collecting infringement threats on the basis of an IOC for major behaviors at an endpoint.

The EDR system 100 may perform intelligent forensic analysis and retrieve malicious behaviors through a forensic analysis module.

The EDR system 100 may analyze malicious behaviors by executing a file in a physical real-machine-based sandbox environment to respond to malicious code that avoids a virtual machine.

In addition, the EDR system 100 may image big data collected through static and dynamic analysis of malicious code, and efficiently detect variant malicious code derived from the original malicious code by sequentially performing machine learning preprocessing (ML-PreP) (S12), image learning, image classification, a grouping process, and the like. Data, such as collected data, imaging results, preprocessing results, learning results, classification results, grouping results, and detection results, may be stored in a storage (STO) (S13). The stored data may be processed through a postprocessing (PostP) (S14), such as image analysis, and stored again in the storage.

When encryption performed by an unauthorized process is detected through analysis of a behavior of ransomware at an endpoint, the EDR system 100 may instantly back up an original file in a driver to a temporary storage folder and restore data using the original file stored in the temporary storage folder when it is determined that a ransomware attack occurs.

In addition, the EDR system 100 may manage latest TI, such as an IoC, a malware pattern, a YARA rule, a malware source, and a C&C server, and threat information, which are collected through various analyses, in a format such as OpenIOC or STIX, and share the latest TI and the threat information with other systems or distribute the latest TI and the threat information to other systems through a standard protocol such as TAXII.

Table 1 shows main performance values of data, which is collected by the data collector 130 of the EDR system 100, according to collection paths.

a C&C server or a malware source (S22), transmit a suspected file among malicious codes collected from a cloud and results of collecting information to a sandbox analysis module (S24), and store an information collection result report in a database (DB) (S26). In this case, data analyzed by the sandbox analysis module may also be stored in the source DB (S25).

Thereafter, the analysis system may receive data stored in the source DB (S27), primarily verify the data and output the data (S28), and score the data by self-verifying and sorting a result of primarily verifying the data (S29). The scored data may be stored in an IoC DB, and transmitted to or shared by the endpoint agent 200.

The endpoint agent 200 may compare agent data, which is collected by a computing device corresponding to an endpoint agent with an IoC received beforehand through an internal analysis system 210 and analyze the agent data (CA).

Figure 3:
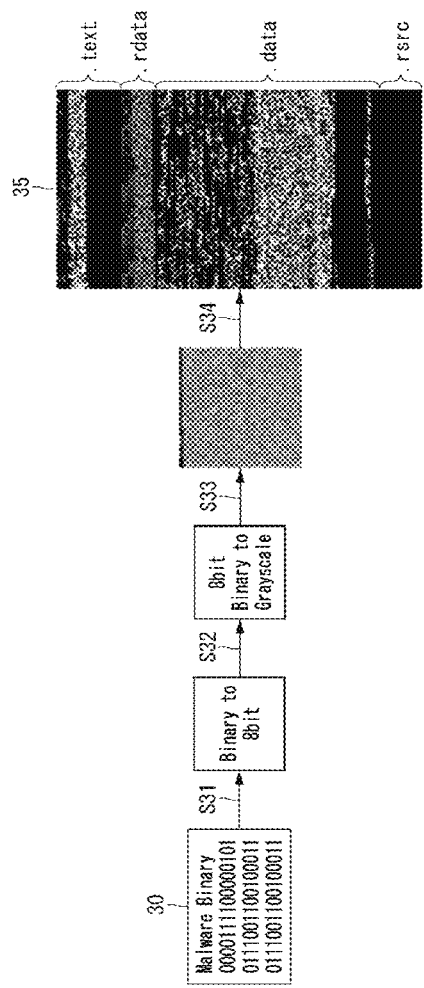
FIG. 3 is a diagram for describing an image-based malware detection process to be employed in the EDR system of FIG. 1.

More specifically, as shown in FIG. 3, a malware binary 30 collected by the analysis system may be read in units of unsigned 8-bit integer vectors or bytes to form a two-dimensional (2D) array (S31), and be converted into an image format on the basis of a width size of the 2D array (S32 and S33). Here, the 2D array may be referred to as a byte array, and the image format may include a visualization of a grayscale image ranging from 0 (black) to 225 (white).

According to the present embodiment, an image array with a unique image texture 35 may be generated for several parts of an execution file, e.g., different sections or binary pieces (text, rdata, rsrc, and the like) of malicious code.

Figure 4:
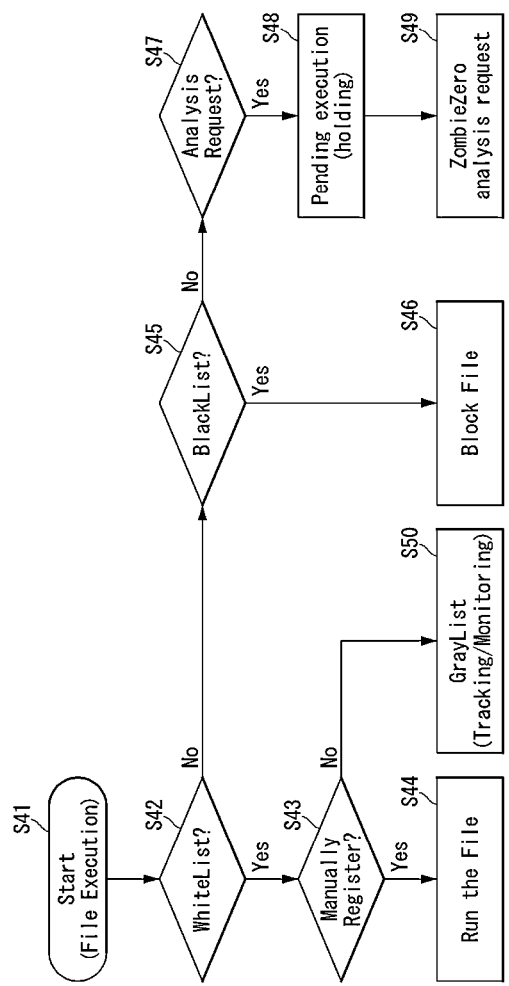
FIG. 4 is a flowchart of a malware detection process to be employed in the EDR system of FIG. 1.

FIG. 4 is a flowchart of a malware detection process to be employed in the EDR system of FIG. 1.

Referring to FIG. 4, the EDR system or an analysis system thereof may perform a behavior-based whitelist exception handling procedure (a graylist function).

More specifically, in a behavior-based whitelist exception handling technique to be employed in the EDR system or the analysis system, files or code determined as normal through automatic analysis or machine learning-based analysis using a tool such as the ZombieZERO system except for a whitelist registered manually by a user may be registered in a graylist, and tracking and surveillance may be continuously performed by an endpoint agent on the basis of the graylist.

TABLE 1

| Data collection path | Variant malware analysis time | Similar behavior detection accuracy | Risk process detection rate | Agent-supported platform | Number of pieces of data processed simultaneously by agent |
| --- | --- | --- | --- | --- | --- |
| Five or more | 0.08 seconds or less | 90% or more | 60% or more | Three platforms or more | 100 |

Figure 2:
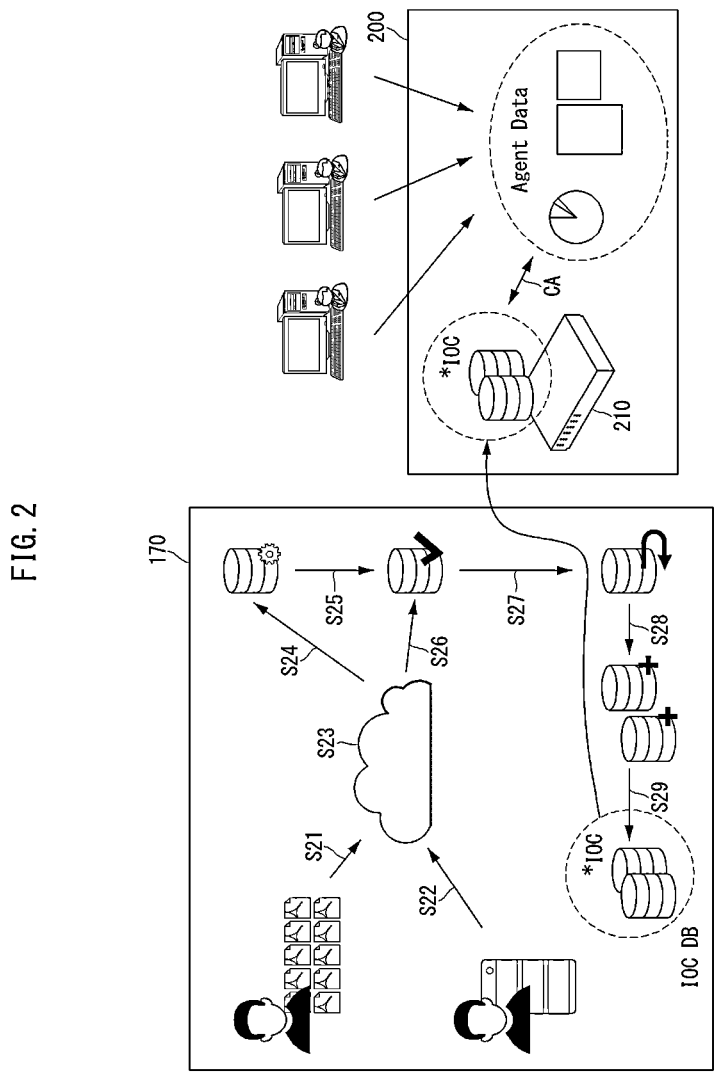
FIG. 2 is a diagram for describing an indicator of compromise (IoC) and threat information management system to be employed in the EDR system of FIG. 1, and an endpoint agent.

FIG. 2 is a diagram for describing an IoC and threat information management system to be employed in the EDR system of FIG. 1, and an endpoint agent. FIG. 3 is a diagram for describing an image-based malware detection process to be employed in the EDR system of FIG. 1. Referring to FIG. 2, for intelligent forensic analysis, an IoC and threat information management system 170 and an endpoint agent 200 may share an IoC to visualize and advance malicious code.

That is, an analysis system that includes an IoC and threat information management module may collect suspected files or source information through the IoC and threat information management module (S21) or collect information about For example, in order to defend malicious code operated only under specific conditions such as time, place, user, and virtual avoidance, an agent installed in a user terminal at an endpoint may be set to continuously track or surveil the malicious code.

A malware detection scenario using a graylist will be described below.

First, when a user executes a file to be analyzed automatically or by machine learning or a file registered in a graylist, an endpoint agent (hereinafter referred to simply as an agent) determines whether the file has been registered in the whitelist (S42) or determines whether the file has been registered manually by a user (S43), and does not limit the execution of the file (runs the file) (S44).

When the file or a process using the file is executed, the agent continuously tracks and surveils the file or process. When it is determined in the tracking and surveillance of the file or process that the file is not registered in the whitelist (no in S42), it is determined whether the file is registered in a blacklist (S45). When the file is registered in the blacklist, the file is blocked (S46). Meanwhile, when the file is not registered in the blacklist, it is determined whether the file is a target to be analyzed (S47). In special cases, when the file is not a target to be analyzed, the current process may be ended. When the file is a target to be analyzed, the execution of the file is pending (holding) (S48), and an analysis request to analyze the file using a ZombieZERO security solution or the like may be performed (S49). The ZombieZERO security solution is a type of security solution associated with or included in the analysis system, an IoC and threat information management system, or the like.

Meanwhile, when the file is registered in the whitelist but was not registered by the user (no in S43), the agent may register the file in a graylist and perform tracking and monitoring when the file is executed (S50).

In addition, the agent may block the file or the process when a malicious behavior such as a ransomware behavior and damage to a master boot record (MBR) is detected, and request the analysis system or a corresponding server to delete the file from the graylist and register the file in the blacklist.

Figure 5:
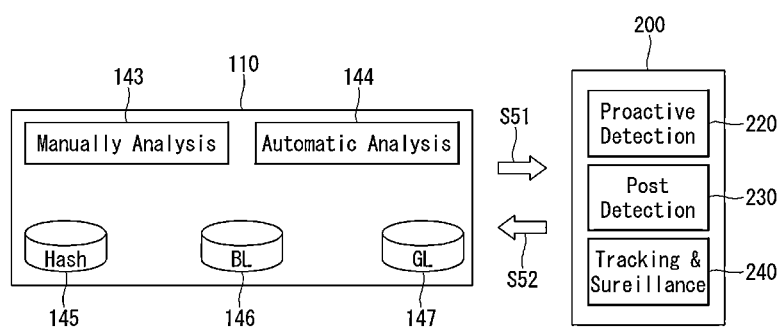
FIG. 5 is a diagram for describing interworking between an analysis system of the EDR system of FIG. 1 and an endpoint agent.

FIG. 5 is a diagram for describing interworking between an analysis system of the EDR system of FIG. 1 and an endpoint agent.

Referring to FIG. 5, an analysis system 110 of a server may include a manual analysis module 143, an automatic analysis module 144, a whitelist (WL) DB 145, a blacklist (BL) DB 146, and a graylist (GL) DB 147. The manual analysis module 143 may perform manager analysis, whitelist registration, blacklist registration, etc., and the automatic analysis module 144 may perform an antivirus function, static analysis, dynamic analysis, and machine learning analysis. For the dynamic analysis, a virtual machine or a real machine may be used. The analysis system 110 having the construction described above may include an artificial intelligence-based analysis platform and provide a malware detection policy to the endpoint agent 200 (S51).

The endpoint agent 200 may function as a next-generation EDR device, include a proactive detection module 220 and a post detection module 230, and perform a tracking and surveillance function 240 for a file executed at an endpoint or in a certain computing device. The endpoint agent 200 may transmit a log such as information about a specific file or an execution event log of the file to the analysis system 110 according to a tracking and surveillance result (S52).

Figure 6:
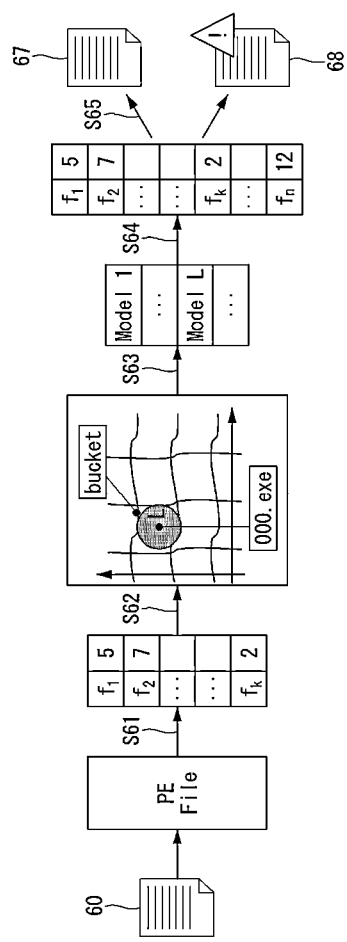
FIG. 6 is a diagram for describing a machine learning-based malware detection process to be employed in the EDR system of FIG. 1.

FIG. 6 is a diagram for describing a machine learning-based malware detection process to be employed in the EDR system of FIG. 1.

Referring to FIG. 6, the EDR system or the analysis system thereof may extract feature information of an execution file such as a portable executable (PE) file among files 60, which are input normally, to detect malicious code by machine learning (S61). The feature information may be stored such that integer values are assigned to features, e.g., 5, 7, and 2 are respectively assigned to a first feature $f_1$, a second feature $f_2$, and a $k^{th}$ feature $f_k$. An integer value representing a certain size or width may correspond to a certain vector or bytes.

Next, the analysis system may perform similarity hashing on the basis of the stored feature information (S62). The similarity hashing may include a similarity-based hashing procedure such as deep hashing for a similarity search. In the similarity hashing, the same hashing value may be generated from the same data, and the difference between hashing values generated from pieces of data that are substantially the same may be inversely proportional to a similarity between the pieces of data. For example, hashing may be performed using a data point of a certain execution file (000.exe) as a bucket.

Next, the analysis system may compare a similarity hashing result with a plurality of pre-trained classification models model 1, model L, etc. to determine whether the similarity hashing result matches one of the plurality of pre-trained classification models model 1, model L, etc. (S63).

When the similarity hashing result does not match any one of the pre-trained classification models, i.e., when malicious code is not detected, the analysis system may expand the feature information for deep detection and check whether the similarity hashing result matches a machine learning model such as a decision tree (DT) ensemble to sort out a normal file 67 and a malicious file 68 (S64). Here, the expanded feature information may be a result obtained by adding other feature information, which is additionally extracted from the file or has already been extracted but is not included in the feature information, to the feature information (basic feature information) described above, to increase the number of pieces of feature information of a deep detection target to be greater by a certain multiple (an integer multiple greater than 1) than the pieces of the basis feature information. The DT ensemble may be a specific model designed to exhibit higher performance than a model obtained by combining several decision trees.

According to the present embodiment, machine learning-based malware analysis can be advanced and an agent function can be advanced. That is, a machine learning model of the present embodiment may be trained with a normal file and a file containing malicious code, and whether a suspected file is malicious may be detected by the trained model. Alternatively, a machine learning model may be implemented to train a similarity hashing function with basic feature information of an execution file and sort out a normal file and a malicious file, or to train the similarity hashing function with all feature information extractable from the execution file and sort out a normal file and a malicious file.

Figure 7:
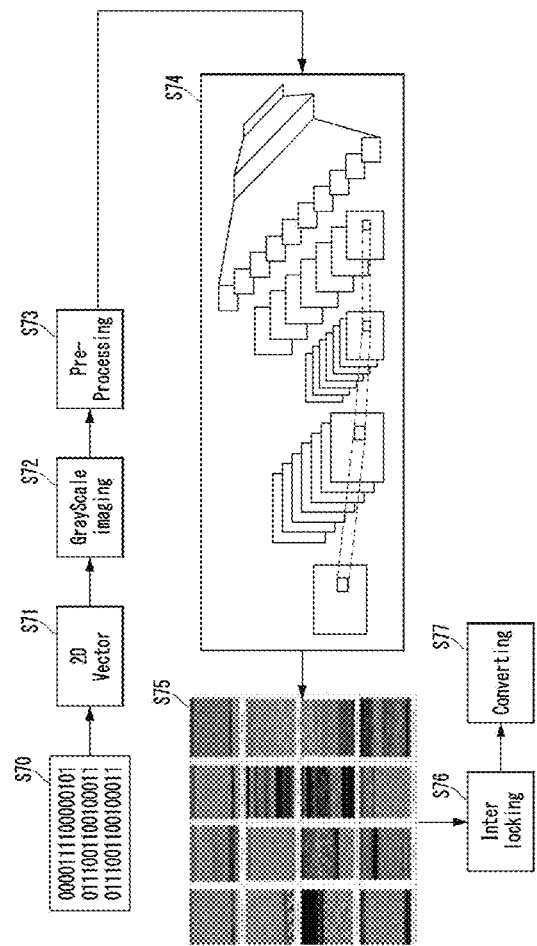
FIG. 7 is a diagram for describing an image-based malware detection process to be employed in the EDR system of FIG. 1.

FIG. 7 is a diagram for describing an image-based malware detection process to be employed in the EDR system of FIG. 1.

Referring to FIG. 7, the analysis system of the EDR system may detect malicious code by applying a malware image analysis algorithm.

Specifically, the analysis system may convert an execution file or at least part of the code thereof into 2D vectors (S70 and S71). Next, the analysis system may image the 2D vectors in grayscale (grayscale imaging) (S72).

Next, the analysis system adjusts an image size of the image data or array imaged from the 2D vector through preprocessing so that the image data or array may be used as an input for deep learning (S73).

Next, the size-adjusted image data is sorted out by a machine learning model to determine a correlation between homogeneous or similar malicious codes (S74). As the machine learning model, an open-source-based similarity classification model that includes a convolution layer, a CI feature map, a subsampling layer, an S1 feature map, a convolution layer, an S2 feature map, a subsampling layer, a convolution layer, and a fully-connected layer between an input layer and an output layer, or the like may be used.

A result of the determination, i.e., a result of sorting out malicious code, using the machine learning model may be expressed using images of various types of image textures (S75). The result of sorting out malicious code may be interlocked with a separate user analysis system (S76), converted into a certain DB, and stored (S77).

According to the present embodiment, the accuracy of malware classification technology can be improved using image data, and the accuracy of measuring a degree of risk can be improved by analyzing a ripple effect of spreading malicious code on the basis of an analysis of a relation between malicious codes.

Figure 8:
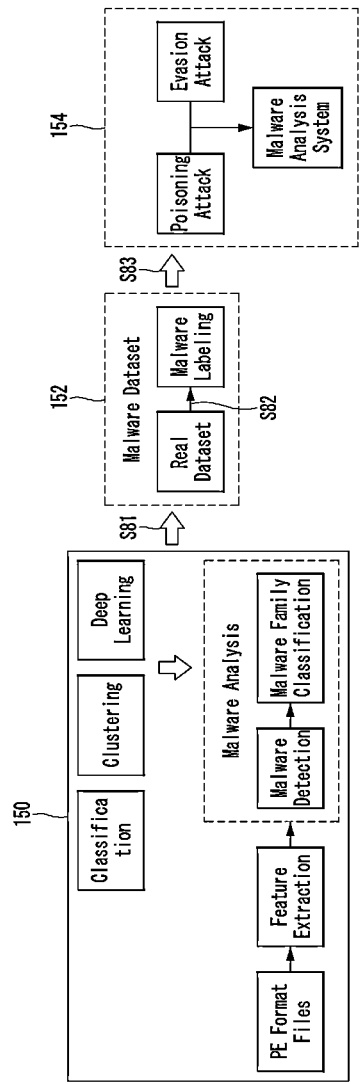
FIG. 8 is a diagram for describing a process of improving the reliability of modeling threats by an analysis system to be employed in the EDR system of FIG. 1.

FIG. 8 is a diagram for describing a process of improving the reliability of modeling threats by an analysis system to be employed in the EDR system of FIG. 1.

Referring to FIG. 8, the analysis system is an artificial intelligence-based malware analysis system, and may include a dynamic malware analysis system 150 and the like and be designed as described below. That is, the analysis system may use malware samples such as a malware dataset 152 to verify the performance of the analysis system (S81), and reflect a performance verification result in machine learning evasion threat modeling (S83).

The dynamic malware analysis system 150 may include a classification module, a clustering module, and a deep learning model, and perform malware detection and malware family classification through malware analysis after extraction of features of portable execution (PE) format files.

The malware dataset 152 may include a dataset generated by preforming malware labeling (S82) on a real dataset.

The analysis system may be a malware analysis system and be configured to perform machine learning evasion threat modeling by analyzing a poisoning attack and an evasion attack.

According to the present embodiment, an effective malware analysis system can be designed using various classification and clustering algorithms for malware analysis. In addition, detailed variant malware group classification can be performed, and not only normal code samples and malicious code samples but also malicious code samples labeled as various variant groups can be used to verify the performance of the system, as well as sorting out malicious codes and normal files. In addition, a malware analysis system can be designed in consideration of the compatibility with an agent installed at an endpoint, and threat models for various attacks which may be carried out for an artificial intelligence-based malware analysis system can be effectively established in terms of machine learning model evasion attacks.

Figure 9A:
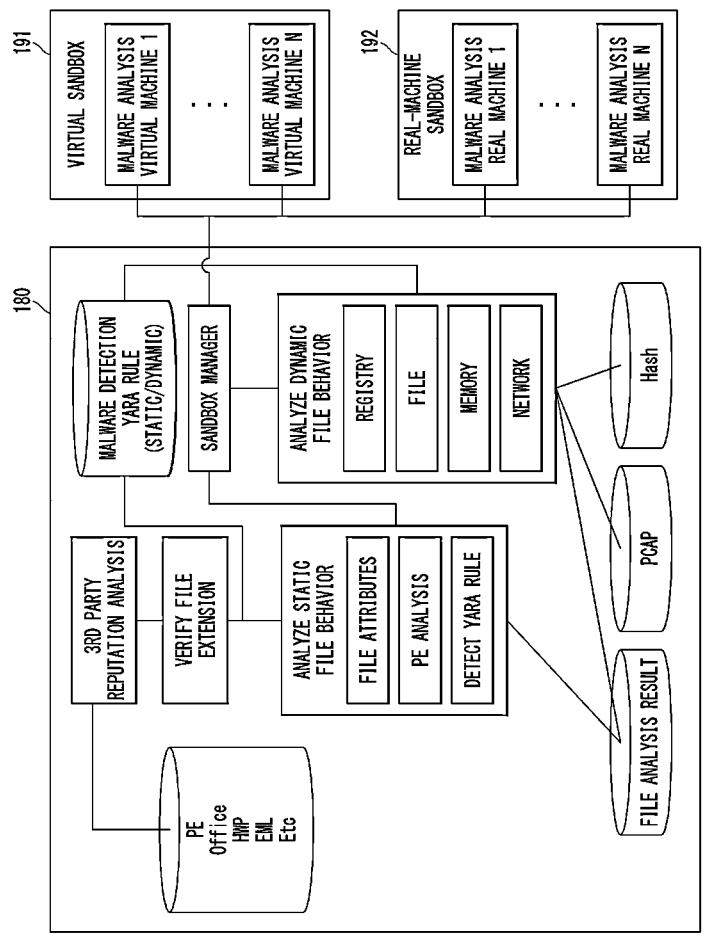
FIG. 9A is a diagram for describing security application programming interface (API) interworking for multi-dimensional analysis to be employed in the EDR system of FIG. 1.
Figure 9B:
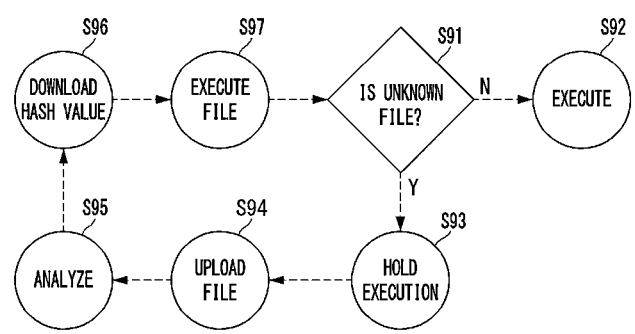
FIG. 9B is a flowchart for describing major operational principles of the security API interworking of FIG. 9A.

FIG. 9A is a diagram for describing security application programming interface (API) interworking for multi-dimensional analysis to be employed in the EDR system of FIG. 1. FIG. 9B is a flowchart for describing major operational principles of the security API interworking of FIG. 9A.

Referring to FIG. 9A, the EDR system may further include a malware interworking analysis system 180. The malware interworking analysis system 180 may be included in the analysis system 110 (see FIG. 1) of the EDR system, and may be referred to as an interworking analysis module in this case.

The interworking analysis system 180 may include a third-party reputation analysis module, a file extension verification module, a static file behavior analysis module, a sandbox manager, a dynamic file behavior analysis module, a file DB, a static or dynamic malware detection YARA rule DB, a file analysis result DB, a packet capture (PCAP) DB, a hash DB, etc.

The file DB may store and manage PE files, office files, HWP files, e-mail (eml) files, and the like. The static file behavior analysis module may be connected to the file extension verification module, the malware detection YARA rule module, and the sandbox manager, include at least one submodule for YARA rule detection, and be connected to the file analysis result DB.

The dynamic file behavior analysis module may be connected to the sandbox manager and the malware detection YARA rule module, include at least one submodule for analyzing threat behaviors in a registry, files, memory, a network, etc., and be connected to the file analysis result DB, the PCAP DB, and the hash DB. The PCAP DB may include an API for detecting network traffic.

The sandbox manager may be connected to a virtual sandbox 191 and a real-machine sandbox 192. The virtual sandbox 191 is a virtual machine sandbox and may include multiple malware analysis virtual machines (virtual machines 1 to n), and the real-machine sandbox 192 may include multiple malware analysis real machines (real machines 1 to n).

According to the present embodiment, a system for collecting and distributing latest TI, such as an IoC, a malware pattern, a detection rule, a malware source, and a C&C server, in real time can be built. For the advancement of a static/dynamic analysis and an agent function, a malware analysis process interworking using a virtual machine or a real machine can be effectively implemented for collected files.

According to the present disclosure, distribution of an antivirus engine, reputation analysis, detection of access to a uniform resource locator (URL), behavior-based analysis, etc. can be effectively performed through security API interworking for multi-dimensional analysis. Furthermore, through a virtual machine bypass detection process, an identifier (ID) of a central processing unit (CPU) at an endpoint, whether there is a behavior of a virtual machine, a process searching criterion, etc. may be set to be used for detecting malicious code.

In addition, according to the present disclosure, behaviors of ransomware occurring at an endpoint can be analyzed in real time to provide an environment in which data can be instantly backed up to a temporary storage folder in a driver to restore the data with the original file when ransomware is detected.

For example, as shown in FIG. 9B, when a file is a known file (N in S91), the execution of the file is not restricted (S92), but when an unknown file is attempted to be executed (Y in S91), the EDR system holds the execution of the file (S93), uploads the file to the analysis system (S94), analyzes the file through the analysis system (S95), downloads an executable hash value (S96), and determines whether to execute the file by comparing an analysis result of the analysis system with the hash value (S97).

Figure 10:
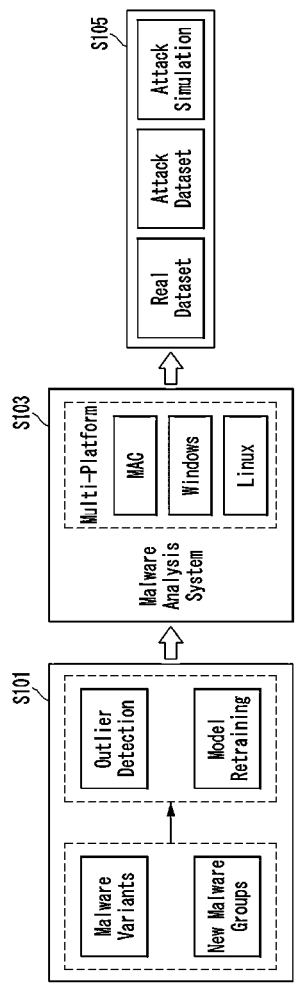
FIG. 10 is a diagram for describing a malware classification process of an endpoint agent corresponding to at least a part of the EDR system of FIG. 1.

FIG. 10 is a diagram for describing a malware classification process of an endpoint agent corresponding to at least a part of the EDR system of FIG. 1.

Referring to FIG. 10, in order to solve problems due to variant or new malicious codes, the endpoint agent may be configured to perform outlier detection and model retraining through a malware learning and classification module with respect to malware variants and new malware groups (S101).

The outlier detection may be understood as detection of data with an error or abnormality, and the model retraining may be understood as retraining performed using a normal image texture, an added malware image texture, and the like to respond to variants and new malware.

The endpoint agent may include a malware analysis system installable on multiple platforms. The endpoint agent may form multiple platforms such as Macintosh (MAC), Windows, and Linux through the malware analysis system (S103).

The endpoint agent may set dataset attacks, such as poisoning of a real dataset, as machine learning target attacks on multiple platforms to perform an attack simulation and train artificial intelligence models through the attack simulation (S105).

According to the present embodiment, a malware classification system may be implemented on the basis of artificial intelligence and an avoidance technology may be effectively learned.

In addition, a single analysis system may analyze malicious code based on a specific platform such as Windows, Macintosh, or Linux, and verify the performance of an implemented system using malicious code samples. For example, models may be trained in consideration of a scenario in which variant malicious code of an existing group and malicious code anew group appear. In addition, existing labeled malicious code group information and time series data may be used to verify new and variant malware analysis. In addition, an attack dataset may be constructed by modifying an existing sample by applying thereto various attack techniques, such as a poisoning attack and an evasion attack, targeted to machine learning, and a malware analysis system may be trained using the attack dataset to improve a malware detection success rate.

Figure 11:
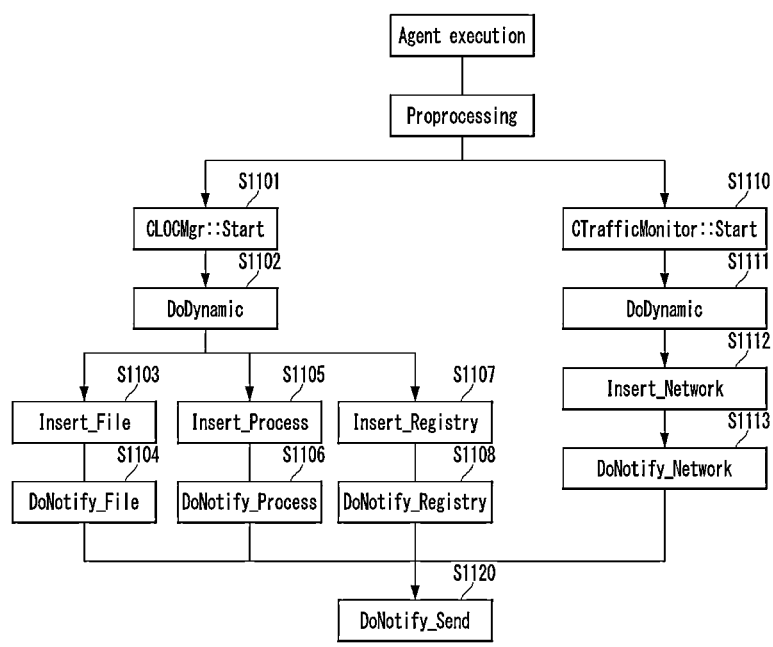
FIG. 11 is a diagram for describing a design process of an IoC-based analysis module of an analysis system to be employed in the endpoint agent of FIG. 10.

FIG. 11 is a diagram for describing a design process of an IoC-based analysis module of an analysis system to be employed in the endpoint agent of FIG. 10.

Referring to FIG. 11, the endpoint agent may apply an antivirus (AV) engine inside an agent for intelligent forensic analysis.

More specifically, the agent may be executed to perform a preprocessing process.

In the preprocessing process, a specific manager CIOCMgr collecting file, process, or registry events is started (S1101), and a specific traffic manager CTrafficMonitor collecting network events is started (S1110) to collect events in the endpoint or a specific computer device.

When an event occurs, a log of the event may be compared with a rule through a specific first function (DoDynamic function) (S1102 and S1111), a comparison result, the log, and an analysis result may be stored in a DB through specific second functions (Insert functions) (S1103, S1105, S1107, and S1112), the log and the analysis result may be converted into a JSON format through specific third functions (DoNofity functions) to transmit the stored log and analysis result to a manager (S1104, S1106, S1108, and S1113), and thereafter, Json-format resultant data may be transmitted to the manager through a message (DoNofity_Send) (S1120). The data transmitted to the manager may be displayed on a user interface (UI).

Table 2 shows an example of interface configuration for an IoC-based malware analysis function.

TABLE 2

| Module | IoC module |
|---|---|
| Function | CIOCMgr::Start |
| Purpose | Start collecting Event(File, Process, Registry) |
| Parameter | None |
| Return value | Boolean |
| Function | DoDynamic |
| Purpose | Log analysis (compare rules) |
| Parameter | CDynLogData* pLogData |
| Return value | Boolean |
| Function | Insert_Process |
| Purpose | Store process event DB |
| Parameter | CProcessItem &item |
| Return value | None |
| Function | Insert_Network |
| Purpose | Store network event DB |
| Parameter | CNetworkItem & item |
| Return value | None |
| Function | DoNotify_File |
| Purpose | Logarithmize file event (JSON) |
| Parameter | None |
| Return value | Boolean |
| Function | DoNotify_Registry |
| Purpose | Logarithmize registry event (JSON) |
| Parameter | None |
| Return value | Boolean |
| Function | CTrafficMonitor::Start |
| Purpose | Start collecting Event(Network) |
| Parameter | None |
| Return value | Boolean |
| Function | Insert_File |
| Purpose | Store File Event DB |
| Parameter | CFileItem &item |
| Return value | None |
| Function | Insert_Registry |
| Purpose | Store registry event DB |
| Parameter | CRegDBItem &item |
| Return value | None |
| Function | DoNotify_Network |
| Purpose | Logarithmize network event (JSON) |
| Parameter | None |
| Return value | Boolean |
| Function | DoNotify_Process |
| Purpose | Logarithmize process event (JSON) |
| Parameter | None |
| Return value | Boolean |
| Function | DoNotify_Send |
| Purpose | Transmitted to log manager |
| Parameter | vector<string>& jsons |
| Return value | Boolean |

The IoC-based analysis module to be mounted in the agent may modify collected events according to a format and transmit the collected events to an application of the agent. Thereafter, the agent may store the events in the DB or extract only a process part from the events, convert the extracted part into a logarithm in a JSON format or the like, and transmit the resultant extracted part to a manager. Here, the JSON format is configured to change a format of the extracted part so that the extracted part may be transmitted to the manger and thus is replaceable with another format. The agent may provide log information that is an analysis result of an IoC using a rule such as a YARA rule. The agent may use a YARA rule created based on a malicious behavior after an operation log of the malicious behavior is analyzed. In addition, the agent may be configured to use a YARA rule designed to provide information about attack classification and attack methods by additionally writing the attack classification and attack methods on the basis of Mitre ATT&CK.

The agent may be configured to classify log attack methods and provide technical information thereof through information about Mitre ATT&CK T_ID and analysis of collected logs, and provide a URL linked to the ID, so that help files at the MITRE ATT&CK site may be referred to.

The agent may analyze a registry log by applying IoC rules and performing static analysis through these rules. The agent may intensively detect a registry path of disk access and driver access through registry log analysis, and perform disk access and driver access detection security. In this case, a malicious behavior may be detected on the basis of disk access-related logs and related rules.

The agent may analyze an internal process and windows management instrumentation (WMI) through API hooking. That is, the agent may supplement detection of memory-based attacks by analysis of a process and WMI through API hooking, supplement detection of module operations, supplement script-based malicious behaviors, detect malicious behaviors through command lines, and detect script-based malicious behaviors.

In addition, in order to strengthen a network monitoring function, the agent may include a function of detecting a packet payload during network communication and be installed to detect pre-attack preparation such as port scan using a network.

Figure 12:
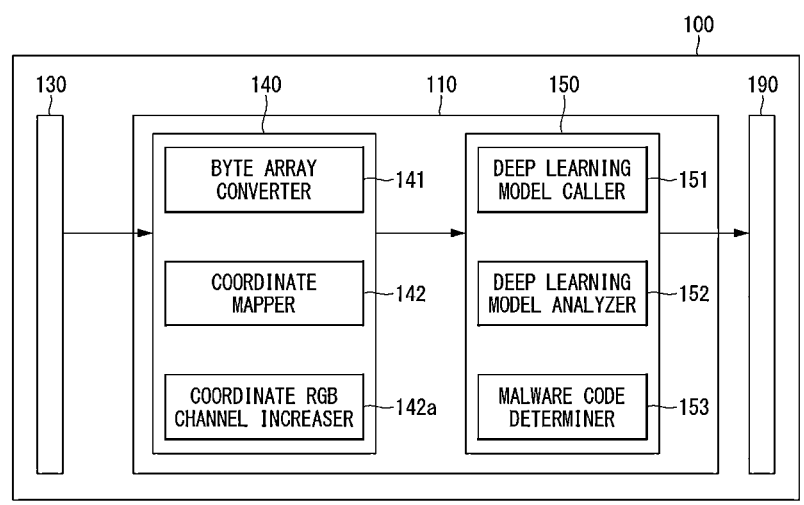
FIG. 12 is a block diagram of an image-based malware detection apparatus and a computing device equipped with the same according to another embodiment of the present disclosure.

FIG. 12 is a block diagram of an image-based malware detection apparatus and a computing device equipped with the same according to another embodiment of the present disclosure.

Referring to FIG. 12, the image-based malware detection apparatus (hereinafter referred to simply as a malware detection apparatus) is a type of the EDR system 100, may be installed at an endpoint or a specific computing device corresponding to the endpoint, and may include an analysis system 110, a data collector 130, an image converter 140, an image analysis system 150, and a storage 190. The analysis system 110 may be referred to as a main analysis system to distinguish it from the image analysis system 150.

The data collector 130 may be configured to detect a file generation event in the specific computing device and extract a file path of the generated file from a file generation event log. Here, the file generation event or the file generation event log may be detected in a process, a file or a registry executed by a processor, a memory or a storage device related to the specific computing device.

When an automatic analysis object, a machine learning analysis object, or a file registered in a graylist is executed, the data collector 130 may transmit the file or a signal requesting a process of the file to be tracked or monitored to the image converter 140 or the analysis system 150.

When a preset specific behavior of a specific file is detected, the data collector 130 may be configured to transmit a signal requesting an image-based malware detection process to be performed on the file or at least some codes of the file to the image converter 140 or the image analysis system 150.

The image converter 140 may correspond to an image processor. The image converter 140 may include a byte array converter 1410, a coordinate mapper 142, and a coordinate RGB channel increaser 142a.

The byte array converter 141 reads either an execution file in a file path of a file from a file generation event log or at least some codes of the execution file in a unit of a vector or bytes consisting of unsigned integer bits, and converts the vector or bytes into a byte array. The byte array corresponds to a 2D vector.

When the execution file is executed, the byte array converter 141 may convert the execution file unpacked by performing memory dump on the execution file loaded to the memory into the byte array and store the byte array.

The coordinate mapper 142 reads the byte array in units of two bytes and maps the byte array on a predetermined sized virtual image. In this case, data obtained by reading the byte array in units of two bytes is used as coordinates (x,y) on the virtual image.

The coordinate RGB channel increaser 142a increases coordinates (x,y) of a predetermined sized image by using the 2-byte data as the coordinates (x,y), and adds RGB channels to the image or increases the RGB channels to store an image or image array containing substantially all information of the byte array. The preset size may be a size of 256×256×3.

The coordinate RGB channel increaser 142a may insert the byte array into the predetermined sized image in units of two bytes in a preset order, designate an increase of a distance to coordinates as a distance parameter, and designate an array angle of an increase of the coordinates as an angle parameter.

In addition, the coordinate RGB channel increaser 142a may be configured to designate a range of the coordinates on the predetermined sized image by increasing the range from a gray scale range of 0 to 255 to a maximum RGB range of {(0,0,0) to (255, 255, 255)} in units of two bytes of the byte array, increase the coordinates by 1, increase a green channel range when an RGB channel range exceeds a predetermined reference range, and increase a blue channel range when the green channel range exceeds the predetermined reference range.

The image converter 140 may be configured to read, for example, a PE file in units of bytes, convert the PE file into a bite array, insert the byte array into an image array having a size of 256×256×3 in units of two bytes, increase at least one pixel value of an image with coordinates (x,y) using a 2-byte value as the coordinates (x,y), add RGB channels, and store an image array having a size of 256×256×3 in an image storage.

In addition, the image converter 140 may be configured to detect a PE file generation event log in a specific folder through a byte array conversion module and a coordinate mapping module to extract a file path, read a file in units of bytes to convert the file into a byte array, perform image conversion by applying an RGB technique to the byte array through a coordinate RGB channel increase module or an RGB image conversion module, and transmit an image array to a DB to store the image array in the DB.

The image analysis system 150 corresponds to an image deep learning analyzer, and performs deep learning analysis on the image array using an image deep learning model. The image analysis system 150 may include a deep learning model caller 151 that calls a pre-trained deep learning model, a deep learning model analyzer 152 that analyzes an image array by inputting the image array into the deep learning model, and a malicious code determiner 153 that determines whether malicious code is included in the image array.

The deep learning model caller 151 may adjust the size of an input layer for analyzing the image array, call the pre-trained deep learning model, and input the image array to the deep learning model.

The deep learning model analyzer 152 analyzes the image array input to the deep learning model and outputs an image-based malware analysis result. The deep learning model may include a transfer-trained resnet model and the like.

The deep learning model analyzer 152 may be configured to perform machine learning-based similarity classification on an image array input to a trained image deep learning model and determine a correlation between homogeneous, variant, or similar malicious codes through machine learning-based similarity classification.

In addition, the deep learning model analyzer 152 may use an image deep learning model trained with a file including malicious code and a normal file. In this case, the deep learning model analyzer 152 may be configured to classify a suspected file as normal or malicious using a trained image deep learning model on the basis of a similarity hashing function trained with basic feature information of an execution file, classify the suspected file as normal or malicious on the basis of a similarity hashing function trained with all feature information extractable from the execution file, classify the suspected file as normal or malicious through a malicious code image analysis algorithm, or classify the suspected file as normal or malicious using a combination of these classification methods.

The malicious code determiner 153 may detect malicious code or determine the possibility of occurrence of a known or unknown threat with respect to an analysis result of the deep learning model analyzer 152, based on a preset threshold.

In addition, the malicious code determiner 153 may detect malicious code or determine the possibility of occurrence of a known or unknown threat with respect to the analysis result of the deep learning model analyzer 152 on the basis of image textures of different sections or binary pieces of an execution file or code.

In order to analyze an image provided from the image storage, the image analysis system 150 described above may be configured to adjust the size of an input layer, to call a pre-trained deep learning model, to input the image to the deep learning model to analyze the image. The result of determining whether the image is malicious and the probability that the image is a malicious image according to a specific threshold is stored in JSON format in a result storage.

The size of the image should be the same as the dimension of the input layer of the deep learning model so that the image analysis system 150 may perform analysis using the deep learning model. In this case, when an image is analyzed using an RGB image conversion technique, characteristics of a byte array of a malicious code file may be prevented from being omitted when the size of the image is adjusted, and the image may be more easily recognized with human eyes due to the representation of colors using the RGB image conversion technique than a grayscale image.

In addition, an image of malicious code data may be processed using color data by increasing RGB channels through the RGB image conversion function to expand characteristics of a byte array of a malicious code file, thereby improving detection performance.

The storage 190 may correspond to an image storage, a result storage, or a storage management system, and be configured to back up files in a driver of a specific computing device to a temporary storage folder in response to a signal from the malicious code determiner 153 when a behavior of ransomware is detected by the analysis system 150 or the image deep learning analyzer.

The analysis system 110 may further include a registration unit (not shown) for registering a specific color image of an execution file or code in a whitelist when the execution file or code is analyzed by automatic analysis or machine learning and is determined to be normal.

As described above, when an image-based malware detection apparatus using RGB colors is used, a file transmitted from an internal network is converted into a fixed-sized image by increasing RGB channels of coordinates through an RGB color conversion technique, the dimension of an input layer of a detection model is set to be the same as the size of the image using the RGB color conversion technique, the image obtained by the conversion is input to the detection model, an analysis result of the detection model is stored in the form of a JSON file, and thus malicious code can be effectively detected using a color image.

By using the malware detection apparatus described above, it is possible to prevent degradation of a detection rate of a deep learning model caused by the generation of an image that is totally different from an image of a packed PE file due to a change of a byte array of the file when the image of the packed PE file is converted. That is, the PE file may be unpacked by performing memory dump on the PE file loaded to a memory as the PE file is executed, so that the byte array may be dumped and converted into an image of the same byte array as the PE file. As described above, a detection rate of malicious code may be improved by converting a memory dump file into an image and analyzing the image. When an image is generated and analyzed through the RGB image conversion function, an image having the same size as the generated image may be obtained and more feature information may be additionally extracted therefrom than a grayscale image, thereby significantly increasing a rate of malware detection using image conversion.

According to the present embodiment, by additionally applying an RGB technique rather than a grayscale method, coordinates of a byte array of a file can be expanded during the conversion of the file into an image and features of the image can be more minutely represented, thereby improving the accuracy and detection range of an image-based malware detection technique.

It is possible to prevent degradation of a detection rate due to the missing of information of a file during the adjustment of the size of an image when a grayscale image-based malware detection method is used. When data labeling is performed to train a model, a problem that a normal image and a malicious image, which are grayscale images, are not easily differentiated from each other with human eyes can be solved.

In a grayscale image-based malware detection method, there are many cases in which a large-sized file is difficult to recognize because coordinates thereof reach maximum values, thereby lowering a detection rate, but in order to solve the above problem, in the present embodiment, the RGB image conversion function may be additionally applied to change an existing image representation method, which uses one channel, i.e., a grayscale channel, and thus is restrictive, to an image representation method using three channels, i.e., RGB channels, to increase a range of coordinates, thereby significantly increasing a recognition rate and a detection rate of large-sized files.

When an image of a file is converted by employing a GLCM transformation technique, the size of the image may be fixed to prevent damage caused by missing information about the file, but when the size of the file increases gradually, features of the image decrease gradually and thus the characteristics cannot be extracted during the conversion of the file into an image when the size of the file exceeds a certain level. Therefore, there is a limit in performing analysis through extraction of features, but the present embodiment provides a solution to the above problem.

According to the present embodiment, advanced persistent threat (APT) response security service technology can be effectively secured through development of a self-service portal and a self-cloud environment, and the quality of security services such as real-time malicious behavior analysis, sharing of threat information in real time between users, and generation of TI information can be advanced through the secured technology. In addition, it is possible to protect internal company information and provide an appropriate solution to respond to unknown new and variant malicious codes.

In addition, according to the present embodiment, big data analysis can be applied to an image-based malware detection apparatus configured to detect malicious behaviors or an EDR system using the same, so that latest malware information can be obtained at various detection points to provide a security service available for 24 hours, 365 days.

Figure 13:
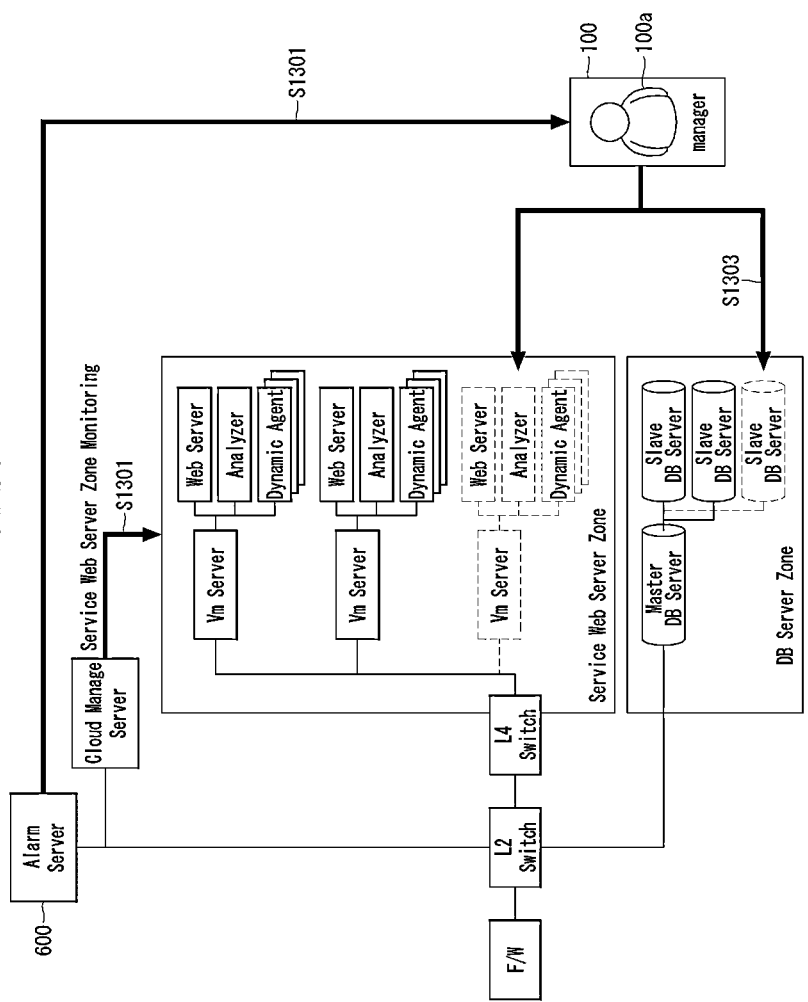
FIG. 13 is a diagram for describing a process of additionally extending a physical resource of a cloud-based virtualization system for the malware detection apparatus of FIG. 12.

FIG. 13 is a diagram for describing a process of additionally extending a physical resource of a cloud-based virtualization system for the malware detection apparatus of FIG. 12.

Referring to FIG. 13, a manager 110a of a malware detection apparatus corresponding to at least a part of an EDR system 100 may be configured to monitor a service web server zone (S1301), receive warning mail from an alarm server 600 connected to a cloud management server (S1302), and add a virtual machine (Vm) server as an additional resource in the service web server zone (S1303) or add a slave DB server as an additional resource in a DB server zone (S1303).

Here, each of a plurality of virtual machine servers in the service web server zone is connected to one of a web server, an analyzer, and dynamic agents that each form a single group. The analyzer or each of the dynamic agents may collect a malicious file hash value, a normal file hash value, a malicious URL, etc., and transmit them to the EDR system 100 or the dynamic agents through a web server to interwork with the analysis system.

The plurality of virtual machine servers are connected to the alarm server 600 and the cloud management server through an L4 switch and an L2 switch. A master DB server connected to the L2 switch in the DB server zone is connected to a plurality of slave DB servers.

The EDR system 100 and each server corresponding to a specific computing device may access a cloud service on the basis of security web (HTTPS Web) communication. Lack of physical resources may occur in a service web server for service management and a DB server for data management due to service overload caused by a plurality of users when the number of users increases. To solve this problem, in the present embodiment, the manager 110a in an agent may communicate with a service web server to exchange information after the installation of the agent.

A load may be dispersed using the L4 switch for load balancing of a plurality of web servers. The cloud management server may be configured to monitor a CPU, a memory, and an input/output (I/O) of each server in the service web server zone and give a warning to the manager 110a through the alarm server 600 when a predetermined threshold is reached, e.g., when a usage rate is 70% or more.

According to the present embodiment, a cloud-based security agent applicable to a cloud-based virtualization system for detecting malicious code may be installed in the EDR system 100 or a specific computing device corresponding thereto.

In this case, the cloud-based security agent may be configured to monitor a file executed in a personal computer (PC) of a user so that a malicious file may be blocked not to be executed to protect the PC of the user, and monitor a network to block access there through a malicious URL. The agent may include a cloud-based web graphic user interface (GUI). In addition, the agent may include a function of detecting and blocking a file encryption behavior to respond to ransomware, and an instant backup function to prevent damage caused by ransomware.

The agent described above may be managed for each customer, generated as an agent in which a customer's key value is registered through a register web server, which is a subscription and payment server, and downloaded to a user's terminal through a network.

According to the present embodiment, a cloud-based virtualization system may employ an analysis system for image-based malware detection and thus provide a service for effectively responding to APT.

Figure 14:
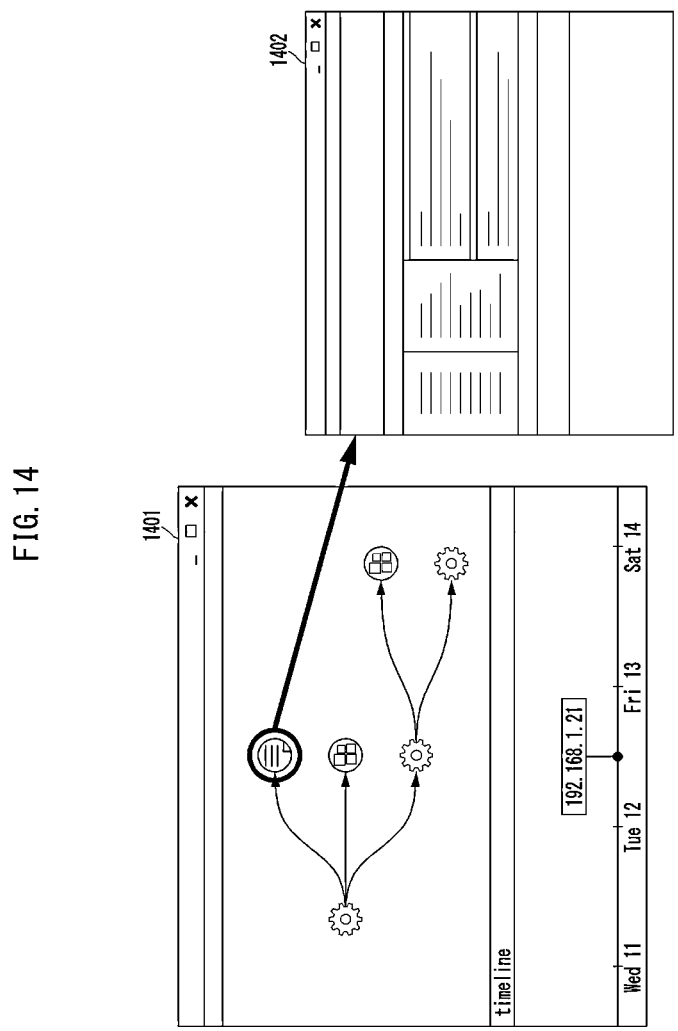
FIG. 14 is a diagram for describing a user interface for analysis information of a malware detection process to be employed in the malware detection apparatus of FIG. 12.

FIG. 14 is a diagram for describing a user interface for analysis information of a malware detection process to be employed in the malware detection apparatus of FIG. 12.

Referring to FIG. 14, a malware detection apparatus may provide iconized process analysis information through a first user interface 1401. The process analysis information may include process correlation information such as a parent and children.

The malware detection apparatus may detect the flow of an initial process and a malicious behavior when the malicious behavior occurs, and provide a user with detailed information of the malicious behavior according to specific analysis information through the second user interface 1402 while displaying the initial process and the malicious behavior on the first user interface 1401.

Figure 15:
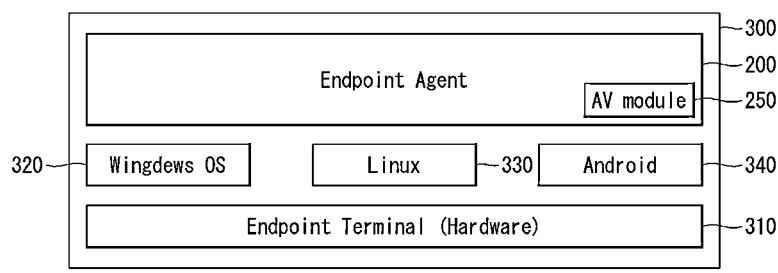
FIG. 15 is a block diagram of an endpoint agent to be mounted in the malware detection apparatus of FIG. 12.
Figure 16:
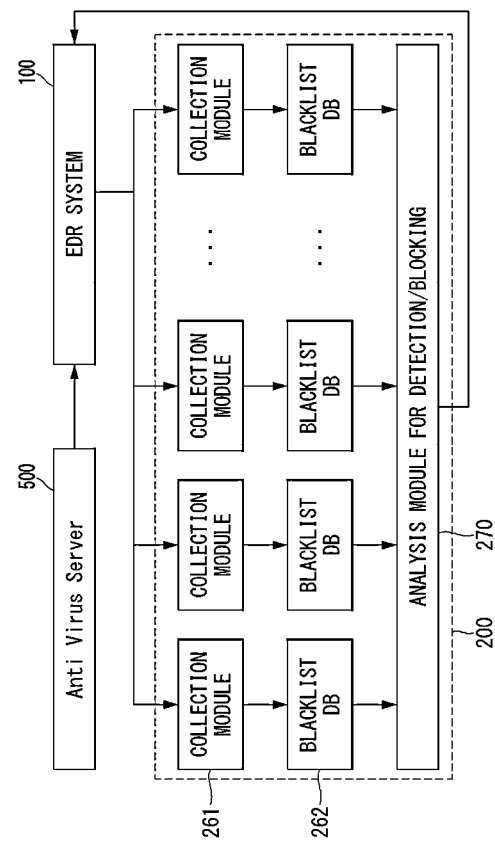
FIG. 16 is a schematic block diagram for describing an internal malware detection structure of the endpoint agent of FIG. 15.

FIG. 15 is a block diagram of an endpoint agent to be mounted in the malware detection apparatus of FIG. 12. FIG. 16 is a schematic block diagram for describing an internal malware detection structure of the endpoint agent of FIG. 15.

Referring to FIG. 15, an endpoint agent 200 may be mounted in a specific computing device 300. In this case, the endpoint agent 200 may include an AV module 250 therein.

The computing device 300 may include at least one of a Windows operating system (OS) 320, a Linux OS 330 or an Android OS 340, and endpoint terminal hardware 310.

As shown in FIG. 16, the endpoint agent 200 included in the computing device 300 may be configured to receive information or data related to malware detection from an EDR system 100 connected to an antivirus server 500, and transmit a malware detection results to the EDR system 100.

In this case, the endpoint agent 200 may include collection modules 261, a plurality of blacklist DBs 262 for receiving blacklists from the collection modules 261 and storing and managing the blacklists, and an analysis module 270 for detecting whether an execution file is normal or malicious and detecting the execution file when the execution file is a malicious file, based on information of the blacklist DBs 262. The analysis module 270 may correspond to at least some functional parts or components of the analysis system 110 of FIG. 1.

Figure 17:
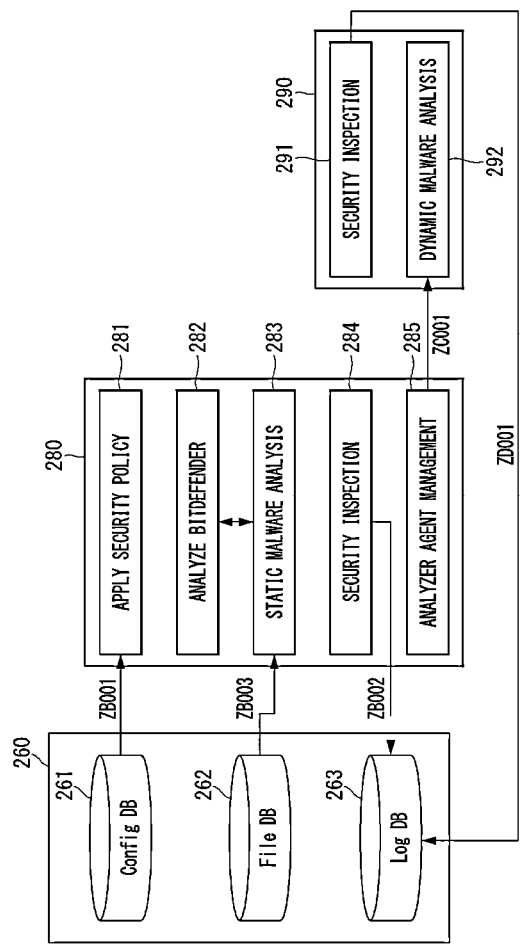
FIG. 17 is a block diagram of an internal analysis module of the endpoint agent of FIG. 15.

FIG. 17 is a block diagram of an internal analysis module of the endpoint agent of FIG. 15.

Referring to FIG. 17, the endpoint agent includes a database unit 260, an analyzer 280, and an analyzer agent 290 as internal analysis module components.

The database unit 260 may store a configuration DB 261, a file DB 262, and a log DB 263. The configuration DB 261 may store a security policy, and the file DB 262 may provide the analyzer 280 with a file for static analysis or bitdefender analysis (ZB003). The log DB 263 may store a result of static malware analysis and a result of bitdefender analysis performed by the analyzer 280 (ZB002), and store a result of dynamic malware analysis performed by the analyzer agent 290 (ZD001). The log DB 263 may be subject to a security inspection of the analyzer 280 or the analyzer agent 290 when an analysis result is stored therein.

The analyzer 280 may include a security policy application module 281, a bitdefender analysis module 282, a static malware analysis module 283, a first security inspection module 284, and an analyzer agent management module 285. The analyzer 280 may read a security policy that is set through an enterprise security manager (ESM) web or the like from the configuration DB 261 and apply the security policy (ZB001). The analyzer 280 may read a file from the file DB 263 to perform static analysis or bitdefender analysis (ZB003). In addition, the analyzer 280 may transmit the file to the analyzer agent 290 through the analyzer agent management module 285, and restore a state of the analyzer agent 290 to an original state from before the analysis of the file when the analysis of the file is completed.

The analyzer agent 290 may include a second security inspection module 291 and a dynamic malware analysis module 292. A result of analysis performed by the dynamic malware analysis module 292 may be transmitted to and stored in the log DB 263 (ZD001).

Table 3 below shows internal analysis interfaces of an endpoint agent as described above.

TABLE 3

| Interface name | Inside/ outside | Description |
| --- | --- | --- |
| ZB001 | Inside | Apply security policy |
| ZB002 | Inside | Transmit static or bitdefender analysis result to DB |
| ZB003 | Inside | Receive file subject to static or bitdefender analysis. |
| ZC001 | Inside | Transmit file, and restore to original state upon completion of dynamic analysis. |
| ZD001 | Inside | Transmit dynamic analysis result to DB. |

FIG. 18 is a diagram of an example of a user interface screen for describing an endpoint security operation of the endpoint agent of FIG. 15. Referring to FIG. 18, the endpoint agent may be an agent to which an AV analysis function is applied and be configured to perform a blacklist policy, e.g., malware detection, blocking, and isolation, by performing malware analysis on an execution file.

For example, the endpoint agent may be embodied as a Windows 10-based endpoint agent. In this case, an analysis status and result may be checked through a type of interface 1810 in a user environment of a computing device and a user input 1830 for a user selection, and an "apply" button for processing or allowing a blacklist may be implemented on a detailed setting interface 1820 for each file to be analyzed.

Meanwhile, the endpoint agent may include an external interface for a process monitoring and agent collection module.

The external interface may be configured to collect information about a file to be executed at an endpoint, such as a PC, compare the collected information with a malicious pattern, block the malicious file or hold the execution of the file, upload the file through a manager web service, and request analysis of the file.

An example of the external interface is shown in Table 4 below.

TABLE 4

| XC.CheckProcess | Collect file information and compare it with malicious pattern |
| --- | --- |

In addition, the endpoint agent collects information about a file to be executed in a PC in which the endpoint is installed. An example of a setting process through a corresponding interface is shown in Table 5 below.

TABLE 5

| Parameter | Description |
| --- | --- |
| Information about execution file | Description: collect path information of execution file Input method: — |

The endpoint agent may further include an internal interface for managing collected file information or interacting with other components. The internal interface may include a ReceiveLog interface, a RecevieFile interface, a KeyRelease interface, and the like. The ReceiveLog interface may allow an agent to transmit a log generated when the agent performs a security function to a manager web service (MWS).

The RecevieFile interface may allow the agent to upload a file to be analyzed to the MWS to request analysis of the file.

The KeyRelease interface allows the agent to transmit to the MWS a request to provide an encryption key, receive, store and initialize the encryption key, inspect a state of a sub-process, and perform the sub-process.

An example of the internal interface is shown in Table 6 below.

TABLE 6

| ReceiveLog | Transmit log |
| --- | --- |
| REceiveFile | Upload file/request analysis |
| KeyRelease | Receive and store/initialize encryption key, and inspect state of sub-process |

In relation to security inspection at the ReceiveLog interface, the agent may transmit to the MWS a log generated when the agent performs a security function as shown in Table 7.

TABLE 7

| Request module | Response module | Performance | Description |
| --- | --- | --- | --- |
| Agent | MWS | MWS | Receive monitoring data from MWS and store monitoring data |

In relation to uploading of a pending execution file at the ReceiveFile interface, the agent may upload a file to be analyzed to the MWS to request analysis of the file as shown in Table 8.

TABLE 8

| Request module | Response module | Performance | Description |
| --- | --- | --- | --- |
| Agent | MWS | MWS | Collect and store file to be transmitted to MWS |

In addition, as shown in Table 9 below, the agent may transmit to the MWS a request to provide an encryption key through the KeyRelease interface, receive, store and initialize the encryption key, inspect a state of a sub-process, and perform the sub-process.

TABLE 9

| Request module | Response module | Performance | Description |
|---|---|---|---|
| Agent | MWS | MWS | Request MWS to provide information about key for encryption, and receive information |

Figure 19:
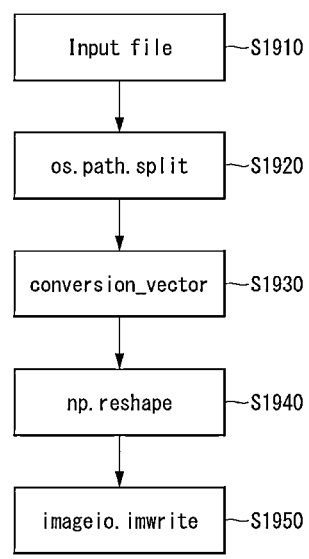
FIG. 19 is a flowchart of a malware visualization process included in a malware detection method performed by the endpoint agent of FIG. 15.
Figure 21:
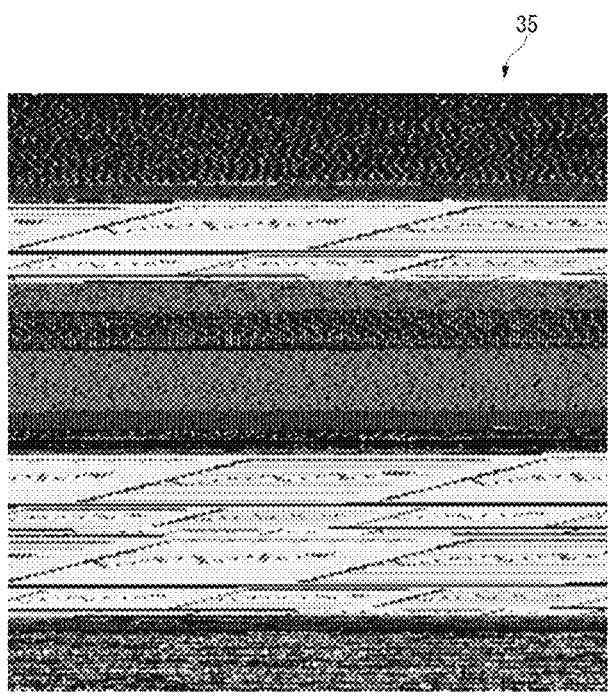
FIG. 21 is a diagram illustrating an example of a resultant image converted from code by the endpoint agent of FIG. 15.

The process monitoring and agent collection module is an endpoint agent for security of a user's PC and may be configured in the form of an installation file to be installed in a Windows environment or the like. FIG. 19 is a flowchart of a malware visualization process included in a malware detection method performed by the endpoint agent of FIG. 15. FIG. 20 is a diagram illustrating an example of a conversion source code for describing a process of obtaining an image by the endpoint agent of FIG. 15 by defining code of an execution file as a width of preset bytes and converting the code into an image. FIG. 21 is a diagram illustrating an example of a resultant image converted from code by the endpoint agent of FIG. 15.

Referring to FIG. 19, a file may be input (S1910), a file name may be extracted from the input file through a first function os.path.split (S1920), the input file may be converted into a 2D vector through a second function conversion_vector (S1930), a form of the 2D vector may be converted through a third function np.reshape (S1940), and an image array may be stored in a memory through a fourth function imageio.imwrite (S1950).

A purpose, parameters, and a return value of each of these functions are shown in Tables 10 and 11 below.

TABLE 10

| Module | Image conversion module |
|---|---|
| Function | os.path.split |
| Purpose | Extract file name |
| Parameter | Path |
| Return value | String |
| Function | conversion_vector |
| Purpose | Convert file into 2D vector |
| Parameter | Path |
| Return value | array, int |

TABLE 11

| Module | Image conversion module |
|---|---|
| Function | np.reshape |
| Purpose | Convert form of 2D vector |
| Parameter | (int, int, int) |
| Return value | Ndrray |
| Function | imageio.imwrite |
| Purpose | Input file |
| Parameter | string, ndarray |
| Return value | None |

According to the present embodiment, collected malicious code is read in the form of a vector consisting of unsigned 8-bit integers to form a 2D array, and imaged in a size of a width of the 2D array. FIGS. 20A and 20B illustrate an example of conversion source code of an interface for imaging malicious code in the size of the width of the 2D array, and details of the conversion source code are as follows:

os.path.split( ): extract the name of a file to be converted into an image from a file path
example) file=path.split("\ \")[−1];
conversion_img( ): input the file path to a conversion_img parameter
In this case, the file path is input to an os.path.getsize function, and the size of the file is saved as a natural log (ln) variable to calculate a width of the image;
specify the width as a square root of the file, and save an array.array 'B' as a variable a to convert the format of the file into unsigned 8-bit integers;
perform conversion using an a.fromfile(f, ln-rem) function for conversion into a 2D vector or a 2D array, and return an array type a and the width;
np.resahpe( ): perform reshaping into an image shape using the array type a and the width returned from conversion_img( ), and store the image shape as a variable g; and
imageio.imwrite( ): put the variable g saved after last conversion and the file name to be saved as parameters in imageio.imwrite( ).

The image described above may be visualized as a grayscale image 35 ranging from 0 (black) to 255 (white) as shown in FIG. 21. In this case, the image conversion module may correspond to a module interface for visualizing a grayscale image that is in a range of 255.

The malware detection apparatus or the endpoint agent of the present embodiment may be configured to generate a color image by adding RGB channels to an image array before it is converted into a grayscale image through a coordinate RGB channel increaser, as well as a grayscale image, and detect malicious code on the basis of the color image.

Figure 22:
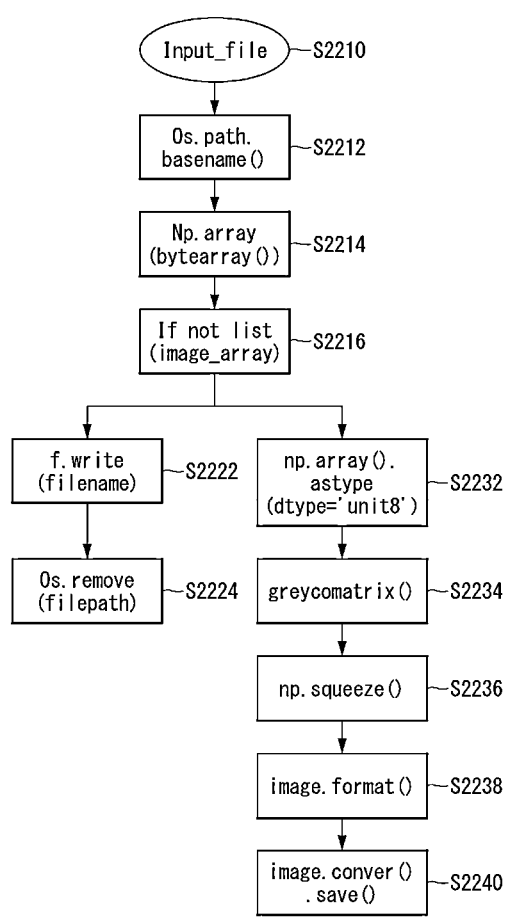
FIG. 22 is a flowchart of a major malware detection process performed by the endpoint agent of FIG. 15.
Figure 24:
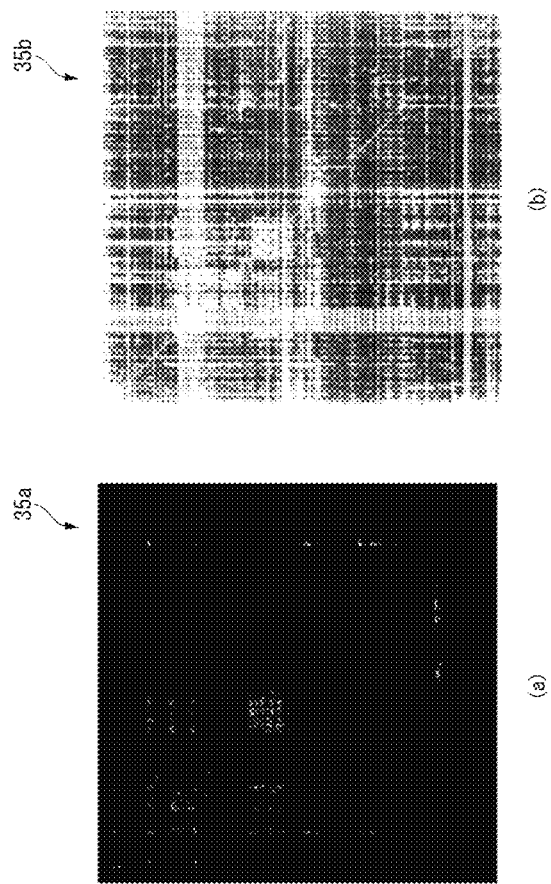
FIG. 24 is a diagram illustrating examples of images before and after imaging of code by a GLCM conversion image module of FIG. 23.

FIG. 22 is a flowchart of a major malware detection process performed by the endpoint agent of FIG. 15. FIG. 23 is a diagram illustrating an example of a conversion source code for describing a gray-level co-occurrence matrix (GLCM) conversion image module to be employed in the malware detection process of FIG. 22. FIG. 24 is a diagram illustrating examples of images before and after imaging of code by the GLCM conversion image module of FIG. 23.

Referring to FIGS. 22 and 23, an endpoint agent (or simply an agent) extracts a file name from a file path of an input file (S2210) through a GLCM conversion image module interface (S2212). That is, the agent may extract a file name from an input file path through a first function os.path.basename.

Next, the agent reads the content of the file using a vector of a certain size or a bytearray function of bytes, and saves the content of the file as a specific first variable img_array or np.array (S2214).

When the first variable np.array or img_array in which the content of the file is saved is empty (if not list), this variable does not contain the content of the file and thus the agent saves a filename in text through a third function f.write and deletes this variable or a corresponding file path through a fourth function os.remove (S2222 and S2224).

Meanwhile, when the first variable np.array or img_array in which the content of the file is saved is not empty, the agent converts this variable into ndarry, which is a multidimensional data structure class, converts a type thereof into unsigned integers (e.g., 2-byte integers), and saves the unsigned integers as a second variable(img_byte) (S2232).

Next, the agent inputs the second variable img_byte to an image parameter through a fifth function grecomatrix, specifies an increase of a distance in a distance parameter, and specifies an array angle of an increase in a value using an angle parameter (S2234).

Next, the agent deletes a (1)-dimensional part from a matrix, which is obtained through the fifth function, through a sixth function np.squeeze (S2236). The agent saves an image storage path of the matrix, from which a specific dimensional part is deleted, as a third variable filepng.

Next, the agent converts the matrix into a little-endian format through a seventh function image.format, and saves a conversion result as a fourth variable img (S2238).

Next, the agent converts the content of the file stored as the fourth variable into a grayscale image, which is a single channel, using an eighth function img.convert, and saves the grayscale image in a file path saved in the fourth variable using a ninth function save (S2240).

An example of a conversion source code that can be used in the malware detection process described above is as shown in FIG. 23, and the meaning of each row thereof is summarized as follows:

filename=os.path.basename(path): extract a file name in a file path;

with open(path, 'rb' as f: img_array=np.array(bytearray (f.read( ))): read the content of the file in units of bytearray, and save the content of the file as an img_array variable;

if not list(img_array): If img_array is empty, the file has no content and thus is deleted after the file name is saved in text;

img_byte=np.array([img_array]).astype(dtype='unit8'): convert img_array into ndarray, convert a type thereof into unsigned integers, and save the integers in img_byte;

matrix=greycomatrix(image=img_byte, distances=[1], angles=[0]): put img_byte into an image parameter, specify an increased distance in a distance parameter, and specify an array angle of an increased value using an angle parameter;

matrix=np.squeeze(matrix): delete a (1)-dimensional part from a matrix;

filepng=save_path+'/'+filename+'png': save an image save path in filepng img=Image.fromarray(matrix.astype('<i4')): convert the matrix into the little-endian format and save a conversion result as an img variable;

img.convert("L").save(filepng): perform conversion into a grayscale image, which is a single channel, using an img.convert function, and save the grayscale image in a filepng path using a .save function.

According to the present embodiment, different sections or binary malicious code may be implemented as a unique image texture. FIG. 24A illustrates an image 35a before conversion into a GLCM conversion module or GLCM conversion source code, and FIG. 24B illustrates an image 35b after conversion into the GLCM conversion module or the GLCM conversion source code.

Tables 12 to 17 below show functions that can be used in the GLCM conversion image module interface described above.

TABLE 12

| Module | GLCM conversion module |
|---|---|
| Function | os.path.basename |
| Purpose | Extract file name |
| Parameter | Path |
| Return value | String |
| Function | np.array ( ) |
| Purpose | Save content of file in byte array and convert byte array into ndarray |
| Parameter | bytearray (f.read( )) |
| Return value | ndarray |

TABLE 13

| Module | GLCM conversion module |
|---|---|
| Function | if not list( ) |
| Purpose | Whether file has content |
| Parameter | image_array |
| Return value | Boolean |
| Function | f.write( ) |
| Purpose | Record file name when file has no content |
| Parameter | filename |
| Return value | None |

TABLE 14

| Module | GLCM conversion module |
|---|---|
| Function | os.remove( ) |
| Purpose | Delete file when file has no content |
| Parameter | filepath |
| return value | None |
| Function | np.array( ).astype( ) |
| Purpose | Record file name when file has no content |
| parameter | [image_array], dtype = 'unit8' |
| return value | ndarray |

TABLE 15

| Module | GLCM conversion module |
|---|---|
| Function | greycomatrix( ) |
| Purpose | Apply GLCM algorithm |
| Parameter | image_array |
| Return value | Matrix |
| Function | np.squeeze( ) |
| Purpose | Delete 1D part |
| Parameter | Matrix |
| Return value | Matrix |

TABLE 16

| Module | GLCM conversion module |
|---|---|
| Function | image.format( ) |
| Purpose | Apply GLCM algorithm |
| Parameter | matrix.astype('<i4') |
| Return value | Matrix |
| Function | np.squeeze( ) |
| Purpose | Delete 1D part |

TABLE 16-continued

| Module | GLCM conversion module |
| --- | --- |
| Parameter | Matrix |
| Return value | Matrix |

TABLE 17

| Module | GLCM conversion module |
| --- | --- |
| Function | image.convert( ).save( ) |
| Purpose | Convert image into single color and save image |
| Parameter | L, file_save_path |
| Return value | None |

Figure 25:
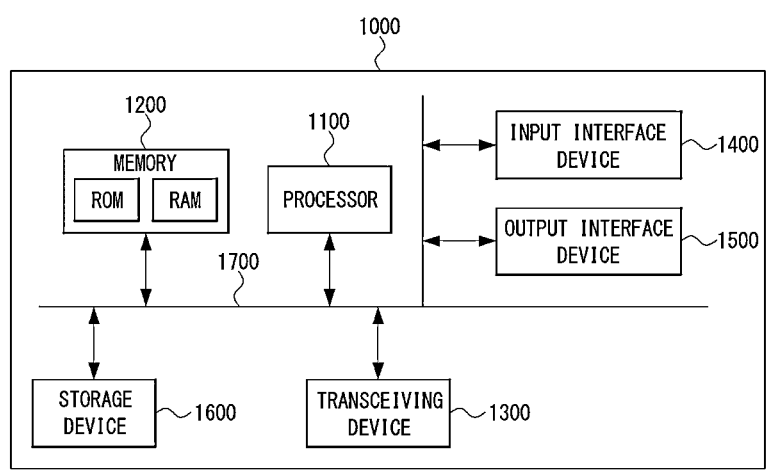
FIG. 25 is a block diagram illustrating main components of an image-based malware detection apparatus according to another embodiment of the present disclosure.

FIG. 25 is a block diagram illustrating main components of an image-based malware detection apparatus according to another embodiment of the present disclosure. An image-based malware detection apparatus (hereinafter referred to simply as "malware detection apparatus") 1000 according to the present embodiment may be installed as at least a component of an EDR system of a server or at least a component of an endpoint agent.

Referring to FIG. 25, the malware detection apparatus 1000 may include at least one processor 1110, a memory 1200, and a transceiving device 1300 connected to a network to perform communication. The malware detection apparatus 1000 may further include an input interface device 1400, an output interface device 1500, and a storage device 1260. The components of the malware detection apparatus 1000 may be connected to one another by a bus 1700 to communicate with one another.

However, the components of the malware detection apparatus 1000 may be connected with one another through an individual interface or bus with respect to the processor 1100 rather than the bus 1700 which is a common bus. For example, the processor 1110 may be connected to at least one of the memory 1200, the transceiving device 1300, the input interface device 1400, the output interface device 1500 or the storage device 1600 through a dedicated interface.

The processor 1100 may execute a program command stored in at least one of the memory 1200 or the storage device 1600. The processor 1100 may be understood as a central processing unit (CPU), a graphics processing unit (GPU), or a dedicated processor configured to perform methods according to embodiments of the present disclosure.

Each of the memory 1200 and the storage device 1600 may be configured with at least one of a volatile storage medium or a nonvolatile storage medium. For example, the memory 1200 may include at least one of a read-only memory (ROM) or a random access memory (RAM).

At least one instruction stored in the memory 1200 or the storage device 1600 or installed in the processor 1100 may be configured, when executed, to allow the processor 1100 to: read either an execution file in a file path of a generated file from a file generation event log detected by a processor, a memory, or a storage device associated with an EDR system, an endpoint, or a computing device corresponding to the endpoint or at least some codes of the execution file in units of unsigned integer bytes, and convert the read bytes into a byte array; read the byte array in units of two bytes; store an image array by increasing a predetermined-size image with coordinates (x,y) by 2-byte data and adding RGB channels; and perform deep learning analysis on the image array by an image deep learning model.

According to the present disclosure, a cyber threat response system can be built through indicator of compromise (IoC)-based forensic analysis to effectively cope with threats using malicious code that bypasses a sandbox, e.g., virtual environment avoidance, a time delay, a trigger attack, a multi-stage attack, and the like.

According to the present disclosure, an autonomous evolving threat response system can be effectively constructed by generating and distributing rules through an artificial intelligence-based automated analysis system to which machine learning and a malware image analysis technique are applied.

According to the present disclosure, reliable information can be generated and distributed by sharing latest threat intelligence (TI) with other agencies and other systems to reduce a time required to respond to malicious code, thereby minimizing cyber damage.

According to the present disclosure, cyber-attacks that will threaten national security can be prevented in advance by next-generation vaccine technology that surpasses the limits of existing vaccines, and a cyber crisis that occurs can be quickly and actively handled, thereby ensuring individual and national security and protecting individual and national profits.

An image-based malware detection method and apparatus according to the present disclosure may be used as a next-generation security solution that may replace antivirus software to respond to advanced cyber threats.

The present disclosure can be embodied as an on-premise platform product for internal security of government agencies and companies, and installed in all terminals in intranets of institutions and companies to effectively provide a next-generation endpoint detection and response (EDR) security service.

In addition, an agent can be installed as a next-generation EDR system of a security as a service (SECaaS) at an endpoint for individual users and operated and managed in a cloud form by a system of a server and thus can be provided in the form of an online security service or a subscription type charged service in cooperation with domestic and foreign communication carriers, as well as an on-premise method.

The operations of the methods according to the above-described embodiments of the present disclosure may be embodied as a computer-readable program or code in a computer-readable recording medium. The computer-readable recording medium may be any type of recording medium storing data readable by a computer system. The computer-readable recording medium may be distributed over computer systems connected through a network so that a computer-readable program or code may be stored and executed in a distribution manner.

The computer-readable recording medium may include a hardware device, such as a ROM, RAM, or flash memory, which is specially formed to store and execute program instructions. The program instructions may include not only machine language code such as that produced by a compiler but also high-level language code executable by a computer using an interpreter or the like.

Some aspects of the present disclosure have been described above in the context of an apparatus but may be described in the context of a method corresponding thereto. Here, blocks or the apparatus corresponds to operations of the method or characteristics of the operations of the method. Similarly, aspects of the present disclosure described above in the context of a method may be described using blocks or items corresponding thereto or characteristics of an apparatus corresponding thereto. Some or all operations of methods may be performed by (or using) hardware devices, e.g., a microprocessor, a programmable computer, or an electronic circuit. In some embodiments, one or more of the most important operations of methods may be performed by such a device.

In embodiments, a programmable logic device (e.g., a field-programmable gate array) may be used to perform some or all functions of the methods described herein. In embodiments, the field-programmable gate array may be operated with a microprocessor to perform one of the methods described herein. In general, methods are preferably performed by a hardware device.

While example embodiments of the present disclosure have been described above with respect to example embodiments thereof, it would be understood by those of ordinary skill in the art that various changes and modifications may be made without departing from the technical concept and scope of the present disclosure defined in the following claims.

What is claimed is:

1. An image-based malware detection method performed by a malware detection apparatus connected to a computing device, the method comprising:
    acquiring data of a collected or input file in units of bytes represented as unsigned integer values, and generating a byte array based on the acquired data;
    defining coordinate value ranges of an image array, the width and height of which are based on a preset size, by converting grayscale values into red, green, and blue channels;
    reading the byte array in units of two-byte segments, wherein each two-byte segment is used to determine coordinates on the image array;
    incrementing a pixel value at each determined coordinate of the image array by one based on the two-byte segments;
    increasing a green-channel value at a coordinate when a value of any red, green, or blue channel at that coordinate exceeds a first predetermined threshold;
    increasing a blue channel value at the coordinate when the green channel value exceeds a second predetermined threshold;
    storing a resulting three-channel image array in a storage device; and
    detecting malicious code or determining a possibility of occurrence of a known or unknown threat based on a predetermined threshold after analysis of the three-channel image array by a pre-trained image deep learning model.

2. The image-based malware detection method of claim 1, further comprising:
    adjusting an input tensor size for analyzing the image array;
    calling the pre-trained image deep learning model; and
    inputting the three-channel image array into the pre-trained image deep learning model.

3. The image-based malware detection method of claim 2, further comprising:
    analyzing texture patterns of different regions of the three-channel image array corresponding to segments or binary portions of the input file; and
    identifying a known or unknown threat based on the texture pattern analysis result of the pre-trained image deep learning model.

4. The image-based malware detection method of claim 1, wherein generating the byte array comprises performing a memory dump of the file loaded into memory, unpacking the memory image, and converting the unpacked data into the byte array upon execution of the input file.

5. The image-based malware detection method of claim 1, further comprising:
    mapping the byte array into a predetermined-size image in units of two-byte segments; and
    setting parameters for coordinate displacement based on a predefined scheme.

6. The image-based malware detection method of claim 1, further comprising: registering an RGB image generated from the input file in a whitelist when the file is determined to be normal by automatic or machine learning-based analysis.

7. The image-based malware detection method of claim 1, further comprising:
    monitoring execution or a process of the input file subject to automated or machine learning-based analysis, or registered in a gray list; and
    triggering the malware detection process when a predetermined malicious behavior is detected.

8. The image-based malware detection method of claim 1, further comprising: training an image deep learning model with a file containing the malicious code and a normal file, and
    performing deep learning analysis comprising classifying, by the pre-trained image deep learning model: (a) a suspected file as normal or malicious on the basis of a similarity hashing function trained with basic feature information of the execution file; (b) a suspected file as normal or malicious on the basis of a similarity hashing function trained with all feature information extractable from the execution file; (c) a suspected file as normal or malicious through a malicious code image analysis algorithm; or (d) a suspected file as normal or malicious using a combination of (a) to (c).

9. The image-based malware detection method of claim 8, wherein the malicious code imaging algorithm performs machine learning-based similarity classification on the three-channel image array input to the pre-trained image deep learning model, wherein the similarity classification comprises determining a correlation between new and variant malicious codes.

10. An image-based malware detection apparatus comprising:
    at least one processor; and
    a memory storing instructions that, when executed by the processor, cause the processor to:
        acquire data of an input file in units of bytes represented as unsigned integer values, and generate a byte array based on the acquired data;
        define coordinate value ranges of an image array of a preset size by converting grayscale values into red, green, and blue channels;
        read the byte array in units of two-byte segments and map each two-byte segment to a coordinate pair (x, y) of the image array;
        increment a pixel value at each mapped coordinate by one;
        increase a green-channel value at a coordinate when a value of any red, green, or blue channel at that coordinate exceeds a first predetermined threshold;
        increase a blue-channel value at the coordinate when the green-channel value exceeds a second predetermined threshold;

store a resulting three-channel image array in a storage device;

invoke a pre-trained image deep learning model;

input the stored three-channel image array to the deep learning model; and determine, based on output of the model, whether the stored three-channel image array represents malicious code.

11. The image-based malware detection apparatus of claim 10, wherein the determination comprises comparing the model's output to one or more predefined thresholds to detect a known malware signature or predict an unknown threat.

12. The image-based malware detection apparatus of claim 10, wherein the determination is based on analysis of texture patterns in different image regions corresponding to distinct binary sections of the execution file.

13. The image-based malware detection apparatus of claim 10, wherein reading bytes comprises performing a memory dump of the execution file loaded into the memory, unpacking the file, and converting the unpacked bytes into the byte array upon execution of the input file.

14. The image-based malware detection apparatus of claim 10, wherein mapping the byte array to the image coordinates comprises:

increasing coordinate indices in units of two-byte segments from a grayscale range to a full RGB range;

incrementing the green channel range when the red channel at a coordinate exceeds a first predetermined reference; and incrementing the blue channel range when the green channel at a coordinate exceeds a second predetermined reference.

15. The image-based malware detection apparatus of claim 10, further comprising a backup storage device, wherein the instructions further cause the processor to back up a driver file from the computing device to a temporary storage folder in response to a ransomware behavior indication from the deep learning determination.

16. An artificial intelligence-based endpoint detection and response (EDR) system comprising:

at least one processor; and a memory storing instructions that, when executed by the processor, cause the processor to:

detect a file generation event in a processor, a memory, or a storage device associated with a specific computing device and extract a file path of the generated file from a file generation event log;

read bytes from an execution file at the extracted file path or from code segments of the execution file;

convert the read bytes into a byte-array;

read the byte array in units of two-byte segments and map each segment to coordinate pairs (x, y) of a predetermined-size image;

increment a pixel value at each determined coordinate by one;

increase a green channel value at a coordinate when a value of any red, green, or blue channel at that coordinate exceeds a first predetermined threshold;

increase a blue-channel value at the coordinate when the green-channel value exceeds a second predetermined threshold;

store the resulting three-channel image array in a storage device;

detecting malicious code or determining a possibility of occurrence of a known or unknown threat based on a predetermined threshold after analysis of the three-channel image array by a pre-trained deep learning model.

17. The artificial intelligence-based EDR system of claim 16, wherein the file generation event is detected by a remote endpoint agent executing on a remote computing device.

18. The artificial intelligence-based EDR system of claim 17, further comprising a cloud management server, wherein the instructions further cause the processor to manage a plurality of the remote computing devices in a network via the cloud management server.

* * * * *